United States Patent
Maeda et al.

(10) Patent No.: US 7,949,860 B2
(45) Date of Patent: May 24, 2011

(54) MULTI THREAD PROCESSOR HAVING DYNAMIC RECONFIGURATION LOGIC CIRCUIT

(75) Inventors: Masaki Maeda, Osaka (JP); Hideshi Nishida, Hyogo (JP); Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 12/093,884

(22) PCT Filed: Nov. 21, 2006

(86) PCT No.: PCT/JP2006/323177
§ 371 (c)(1),
(2), (4) Date: May 15, 2008

(87) PCT Pub. No.: WO2007/060932
PCT Pub. Date: May 31, 2007

(65) Prior Publication Data
US 2009/0307470 A1    Dec. 10, 2009

(30) Foreign Application Priority Data
Nov. 25, 2005    (JP) .................. 2005-339946

(51) Int. Cl.
*G06F 7/38*    (2006.01)
*G06F 15/00*    (2006.01)

(52) U.S. Cl. .......................... 712/229; 712/15

(58) Field of Classification Search ........... 712/229, 712/10, 11, 15, 20, 21, 241
See application file for complete search history.

(56) References Cited

U.S. PATENT DOCUMENTS

| | | | |
|---|---|---|---|
| 4,594,655 A * | 6/1986 | Hao et al. ...................... | 712/218 |
| 5,978,830 A | 11/1999 | Nakaya et al. | |
| 6,052,773 A * | 4/2000 | DeHon et al. .................. | 712/43 |
| 6,360,189 B1 * | 3/2002 | Hinds et al. ...................... | 703/2 |
| 7,389,403 B1 * | 6/2008 | Alpert et al. ..................... | 712/10 |
| 7,428,732 B2 * | 9/2008 | Sandri et al. .................. | 718/104 |
| 2003/0093655 A1 * | 5/2003 | Gosior et al. ................. | 712/228 |
| 2003/0105796 A1 * | 6/2003 | Sandri et al. .................. | 709/104 |
| 2003/0120896 A1 * | 6/2003 | Gosior et al. ................... | 712/32 |
| 2005/0125642 A1 * | 6/2005 | Kimura ......................... | 712/226 |
| 2007/0106879 A1 * | 5/2007 | Tanaka ......................... | 712/214 |

FOREIGN PATENT DOCUMENTS

JP    10-240549    9/1998
(Continued)

OTHER PUBLICATIONS

Haug., G. and Rosenstiel, W.; "Reconfigurable Hardware as Shared Resource for Parallel Threads"; IEEE Symposium on FPGAs for Custom Computing Machines, 1998, Proceedings; pp. 1-2.*

(Continued)

*Primary Examiner* — Aimee J Li
(74) *Attorney, Agent, or Firm* — Wenderoth, Lind & Ponack, L.L.P.

(57) ABSTRACT

A processor according to the present invention cyclically executes a plurality of threads, for each time period allocated thereto. The processor stores, for each thread, configuration information of operation cells. Each of the threads (i) causes the execution of a different predetermined number of operation cells in series, and successively reconfigures an operation cell that has completed a last operation thereof in the time period allocated to a current thread, based on a stored piece of configuration information of the operation cell that corresponds to a next thread, and (ii) causes concurrent execution of an operation cell having a configuration for the current thread and an operation cell having a configuration for the next thread.

6 Claims, 33 Drawing Sheets

FOREIGN PATENT DOCUMENTS

| | | |
|---|---|---|
| JP | 2000-311156 | 11/2000 |
| JP | 2005-165961 | 6/2005 |

OTHER PUBLICATIONS

Brebner, Gordon and Diessel, Oliver; "Chip-Based Reconfigurable Task Management"; Springer-Verlag Berlin Heidelberg, Field-Programmable Logic and Applications Lecture Notes in Computer Science, 2001, vol. 2147/2001; pp. 182-191.*

International Search Report issued Feb. 20, 2007 in the International (PCT) Application of which the present application is the U.S. National Stage.

* cited by examiner

FIG. 9A

| OPERATION CELL_ID \ THREAD ID | THREAD A | THREAD B | THREAD C |
|---|---|---|---|
| OPERATION CELL a | 0 | 0 | 0 |
| OPERATION CELL b | 0 | 1 | 1 |
| OPERATION CELL c | 0 | 0 | 2 |
| OPERATION CELL d | 0 | 1 | 3 |
| OPERATION CELL e | 1 | 3 | 7 |
| OPERATION CELL f | 1 | 2 | 6 |
| OPERATION CELL g | 1 | 3 | 5 |
| OPERATION CELL h | 1 | 2 | 4 |
| OPERATION CELL i | 2 | 4 | 8 |
| OPERATION CELL j | 2 | 5 | 9 |
| OPERATION CELL k | 2 | 4 | 10 |
| OPERATION CELL l | 2 | 5 | 11 |
| OPERATION CELL m | 3 | 7 | 15 |
| OPERATION CELL n | 3 | 6 | 14 |
| OPERATION CELL o | 3 | 7 | 13 |
| OPERATION CELL p | 3 | 6 | 12 |

FIG. 9B

| THREAD ID | THREAD A | THREAD B | THREAD C |
|---|---|---|---|
| OPERATION ROW NUMBER | 4 | 8 | 16 |

FIG. 10

| OPERATION CELL ID \ THREAD ID | THREAD A | THREAD B | THREAD C |
|---|---|---|---|
| OPERATION CELL a | CONFIGURATION INFORMATION A0 | CONFIGURATION INFORMATION B0 | CONFIGURATION INFORMATION C0 |
| OPERATION CELL b | CONFIGURATION INFORMATION A0 | CONFIGURATION INFORMATION B1 | CONFIGURATION INFORMATION C1 |
| OPERATION CELL c | CONFIGURATION INFORMATION A0 | CONFIGURATION INFORMATION B0 | CONFIGURATION INFORMATION C2 |
| OPERATION CELL d | CONFIGURATION INFORMATION A0 | CONFIGURATION INFORMATION B1 | CONFIGURATION INFORMATION C3 |
| OPERATION CELL e | CONFIGURATION INFORMATION A1 | CONFIGURATION INFORMATION B3 | CONFIGURATION INFORMATION C7 |
| OPERATION CELL f | CONFIGURATION INFORMATION A1 | CONFIGURATION INFORMATION B2 | CONFIGURATION INFORMATION C6 |
| OPERATION CELL g | CONFIGURATION INFORMATION A1 | CONFIGURATION INFORMATION B3 | CONFIGURATION INFORMATION C5 |
| OPERATION CELL h | CONFIGURATION INFORMATION A1 | CONFIGURATION INFORMATION B2 | CONFIGURATION INFORMATION C4 |
| OPERATION CELL i | CONFIGURATION INFORMATION A2 | CONFIGURATION INFORMATION B4 | CONFIGURATION INFORMATION C8 |
| OPERATION CELL j | CONFIGURATION INFORMATION A2 | CONFIGURATION INFORMATION B5 | CONFIGURATION INFORMATION C9 |
| OPERATION CELL k | CONFIGURATION INFORMATION A2 | CONFIGURATION INFORMATION B4 | CONFIGURATION INFORMATION C10 |
| OPERATION CELL l | CONFIGURATION INFORMATION A2 | CONFIGURATION INFORMATION B5 | CONFIGURATION INFORMATION C11 |
| OPERATION CELL m | CONFIGURATION INFORMATION A3 | CONFIGURATION INFORMATION B7 | CONFIGURATION INFORMATION C15 |
| OPERATION CELL n | CONFIGURATION INFORMATION A3 | CONFIGURATION INFORMATION B6 | CONFIGURATION INFORMATION C14 |
| OPERATION CELL o | CONFIGURATION INFORMATION A3 | CONFIGURATION INFORMATION B7 | CONFIGURATION INFORMATION C13 |
| OPERATION CELL p | CONFIGURATION INFORMATION A3 | CONFIGURATION INFORMATION B6 | CONFIGURATION INFORMATION C12 |
| OUTPUT DATA SELECTOR | CONFIGURATION INFORMATION AD | CONFIGURATION INFORMATION BD | CONFIGURATION INFORMATION CD |

FIG. 25A

```
DMSet Thd_num, St_Adr, Ed_Adr
```

FIG. 25B

```
DMSet   A,  0×00,  0×3F
DMSet   B,  0×40,  0×5F
DMSet   C,  0×60,  0×6F
```

FIG. 25C

DMRA_A=0×00,  DMWA_A=0×00

DMRA_B=0×40,  DMWA_B=0×40

DMRA_C=0×60,  DMWA_A=0×60

FIG. 26A

```
Rcn_exe   srcA, srcB
```

FIG. 26B

```
Rcn_rd   dstA
```

FIG. 27A

```
Rcn_exe    R1, R2;
Rcn_rd     R3;
```

FIG. 27B

```
Rcn_exe    R1, R2;
Add        R4, R5, R6;
Add        R7, R8, R9;
Add        R10, R11, R12;
Add        R4, R7, R16;
Rcn_rd     R3;
```

FIG. 29

```
Rcn_exe  srcA, srcB   //OPERATION INSTRUCTION TO OPERATION CIRCUIT 2000
                      //srcA and srcB are register numbers
                        in processor 1000
                      //DATA OF srcA and srcB IS USED TO
                        PERFORM OPERATION
                      //AFTER CYCLES FOR OPERATION ROW NUMBER OF
                        OPERATION CIRCUIT 2000 + ONE CYCLE
                      //OPERATION RESULT DATA IS ACQUIRED USING
                        Rcn_rd INSTRUCTION
                      //IN A CASE OF SWITCHING CONFIGURATIONS IN
                        OPERATION CIRCUIT 2000
                      //WHEN OPERATION ROW NUMBER OF CURRENT
                        THREAD IS M, AND THAT OF NEXT THREAD IS N
                      //OPERATION RESULT OF Rcn_exe INSTRUCTION
                        IS NOT GUARANTEED DURING D (=N-M) CYCLES
Rcn_rd   dstA         //INSTRUCTION FOR READING OPERATION RESULT
                        OF OPERATION CIRCUIT 2000
                      //dstA IS REGISTER NUMBER IN PROCESSOR 1000
                      //STORE OPERATION RESULT DATA IN REGISTER OF dstA
```

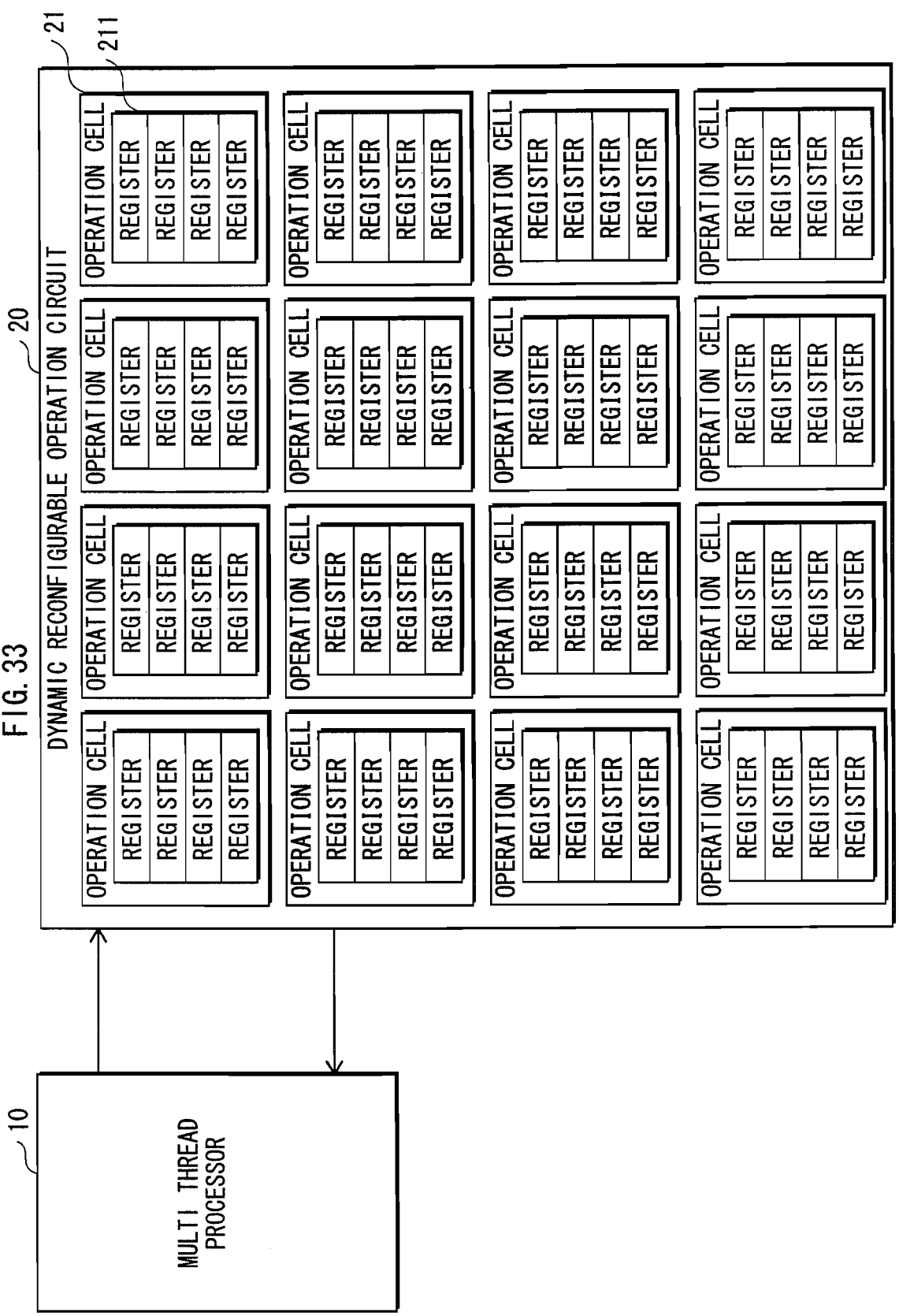

MULTI THREAD PROCESSOR HAVING DYNAMIC RECONFIGURATION LOGIC CIRCUIT

BACKGROUND OF THE INVENTION

1. Field of the Invention

The present invention relates to a multi thread processor that has a reconfigurable logic circuit, and in particular to technology for switching threads.

2. Description of the Related Art

Processors in recent years, for example, processors mounted on audio-visual apparatuses that use digital signals, perform multi-threaded processing in order to perform a plurality of processes in parallel.

Meanwhile, devices that change a logical configuration with use of a program, such as a FPGA (Field Programmable Gate Array) and a PLD (Programmable Logic Device), have been developed. Furthermore, dynamic reconfigurable logic circuits that can change the configuration at high speed have been proposed.

A technique for performing multi-threaded processing has been developed (see Patent Document 1), with use of dynamic reconfigurable logic circuits that satisfy both the flexibility of such software processing and high-speed performance of hardware processing.

The following briefly describes the above-noted technique with reference to FIG. 33.

The multi-threaded processing is performed by a multi thread processor 10 together with a dynamic reconfigurable operation circuit 20.

When interrupted by the multi thread processor 10, which gives an instruction to switch threads, the dynamic reconfigurable operation circuit 20 reconfigures the configuration, namely (i) the configuration of operation cells 21 that are arranged in array and (ii) the configuration of a connection between the operation cells, for a thread to be executed next, and executes the next thread.

When switching threads, each operation cell 21 saves, in an intermediate operation data storing unit register 211 thereof, the result of an operation performed in a current thread, and then performs reconfiguration.

With the above-described technique, all operation cells are reconfigured for the next threads, without the result of the operations of each operation cell being destroyed when switching threads, and without the multi thread processor 10 waiting until the operations of all the operation cells have completed. Therefore, it is possible to shorten the time required for the multi thread processor 10 to start the operation of the next thread, which has an advantageous effect of reducing the degradation of the operation performance.

[Patent Document 1] Japanese Laid-Open Patent Application No. 2005-165961.

BRIEF SUMMARY DISCLOSURE OF THE INVENTION

The Problems the Invention is Going to Solve

However, in such a dynamic reconfigurable operation circuit as described above, the operation cells need a storage register for each of the threads to be executed. Therefore, the larger the numbers of operation cells and threads, the larger the area of the dynamic reconfigurable operation circuit becomes.

Also, in the case of saving the result of the operation in an external memory and such without having any storage registers, to prevent the area of the dynamic reconfigurable operation circuit from becoming larger, a large number of input/output ports are needed to save all the data of the operation cells concurrently. As a result, the area of the input/output ports increases, although the area of the registers in the dynamic reconfigurable operation circuit does not.

The object of the present invention is therefore to provide a processor that includes a dynamic reconfigurable logic circuit and that performs multi-threading, while reducing the degradation in performance caused by the reconfiguration at the time of switching threads, and suppressing the increase of the area of the circuit.

Means to Solve the Problems

In order to solve the above-described problems, the present invention provides a processor that cyclically executes a plurality of threads, wherein an operation is executed in each of the threads repeatedly, the operation being performed by a predetermined number of operation cells one by one in a sequential order, the predetermined number being different for each thread. The processor includes: an operation circuit having a plurality of operation cells whose configurations and connections therebetween are reconfigurable; a reconfiguration unit operable to reconfigure one of the operation cells, based on a piece of configuration information; a configuration information storing unit that stores therein configuration information sets that correspond one-to-one with the threads, and that each include a plurality of pieces of configuration information corresponding one-to-one with the operation cells; and a control unit operable to (i) cause the reconfiguration unit to sequentially reconfigure each operation cell that has a configuration for a current thread when the operation cell has completed a last operation thereof in the current thread, based on a piece of configuration information corresponding to the operation cell that has completed the last operation, the piece of configuration information being in the configuration information set for a next thread, and (ii) cause concurrent execution of an operation cell having a configuration for the current thread and an operation cell having a configuration for the next thread.

EFFECTS OF THE INVENTION

With the above-described structure, a processor according to the present invention sequentially reconfigures each operation cell that has completed the operation of the current thread into the configuration for the next thread, when switching threads. Here, the "current thread" denotes a thread that is currently being executed. Also, the "next thread" denotes a thread that is to be executed immediately after the current thread. Then, the processor performs the operation of the next thread by using the operation cell that has been reconfigured, in parallel with the execution of the current thread. Therefore, it is possible to minimize the time required for switching threads. Also, the area of the circuit is minimized, since the processor does not need any registers for saving data or input/output ports.

In other words, if reconfiguring the dynamic reconfigurable operation circuit from the configuration for the current thread to the configuration for the next thread all at once, the time for the reconfiguration is at least necessary between the end of the current thread execution and the start of the next thread execution. However, the processor of the present invention does not even need such time. When switching the threads, the processor concurrently executes the current thread and the next thread. Therefore, it has an advantageous effect of not only shortening the switching time but also shortening the whole execution time of the threads.

Also, the processor may further include an operation result storing unit that stores an operation result of each of the threads in a different region, the operation result being of a result of operations performed by the plurality of operation cells, wherein the control unit causes the operation result storing unit to store, in a region for the current thread that is located in the operation result storing unit, an operation result of a last operation cell among operation cells in the current thread, and further causes an operation cell that is to be executed first in the next thread to (i) refer to an operation result stored in a region for the next thread and (ii) perform an operation.

With the above-described structure, the processor stores only the result of the operation of the dynamic reconfigurable operation circuit. This eliminates the need of storing the intermediate operation data of each operation cell, and the registers in the operation cells are only needed for the execution of the operation cells. Furthermore, the number of input/output ports is minimized, since the resultant data of the operations of all the operation cells does not need to be output at once. Consequently, the number of registers for storing the intermediate operation data and the area of the input/output ports are reduced, resulting in the area of the whole processor being smaller. Here, "result of the operation" is simply referred to as "operation result" hereinafter.

Furthermore, the processor may further include an operation result storing unit that stores an operation result of an operation cell that has completed a last operation in a thread and that is a last operation cell among operation cells in the thread, wherein the control unit causes execution of an operation cell that is to be executed first in a next repetition in the current thread, based on an operation result of an operation cell that is executed last in a current repetition in the current thread, and when switching threads, causes an operation cell that is to be executed first in the next thread to refer to an operation result that was stored in the operation result storing unit in a previous repetition of the next thread.

With the above-described structure, the multi thread processor directly acquires the data of an operation result from the dynamic reconfigurable operation circuit. Therefore, the time for writing and reading in/from the operation result storing unit is not necessary, and thereby improves the efficiency of the execution of the threads. In other words, the amount of process of each thread that can be executed within a certain length of time increases.

The present invention provides a processor that cyclically executes a plurality of threads, wherein an operation is executed in each of the threads repeatedly, the operation being performed by a predetermined number of operation cells one by one in a sequential order, the predetermined number being different for each thread. Further, the processor comprises: an operation circuit having a plurality of operation cells whose configurations and connections therebetween are reconfigurable; a reconfiguration unit operable to reconfigure one of the operation cells, based on a piece of configuration information; a configuration information storing unit that stores therein configuration information sets that correspond one-to-one with the threads, and that each include a plurality of pieces of configuration information corresponding one-to-one with the operation cells; and a control unit operable to (i) cause the reconfiguration unit to sequentially reconfigure each operation cell that has a configuration for a current thread when the operation cell has completed a last operation thereof in the current thread, based on a piece of configuration information corresponding to the operation cell that has completed the last operation, the piece of configuration information being in the configuration information set for a next thread, and (ii) cause execution of an operation cell having a configuration for the next thread, after execution of an operation cell having a configuration for the current thread.

With the above-described structure, the processor of the present invention causes, when switching threads, the dynamic reconfigurable operation circuit to have a configuration for the next thread by the time the execution of the current thread has been completed, which makes it possible for the processor to start executing the next thread as soon as the execution of the current thread is completed.

BRIEF DESCRIPTION OF THE DRAWINGS

FIG. 9A shows the configuration of an operation cell row number table that shows the number of rows of the operation cells, and an example of the content of the table, and FIG. 9B shows the configuration of a thread row number table that shows the number of rows of the threads, and an example of the content of the table;

FIG. 10 shows the configuration of an operation cell configuration information table 3100 and an example of the content of the table 3100, which is preliminarily stored in a configuration information storing unit 3000;

FIG. 25 shows examples of instructions and such that are related to the operation result storing unit 5000;

FIG. 26A shows an example of an operation instruction given from the multi thread processor 1000 to the dynamic reconfigurable operation circuit 2000, and FIG. 26B shows an example of an instruction for the operation result storing unit 5000 to read the operation result;

FIG. 27 shows an example of a program that consists of Rcn_exe instruction and Rcn_rd instruction in the thread A, and FIG. 27B is an example of a program that has the operation instruction for 4 cycles between the Rcn_exe instruction and the Rcn_rd instruction;

FIG. 29 shows an example of a description of the Rcn_exe instruction in an instruction specification;

FIG. 33 shows a conventional multi thread processor having a dynamic reconfigurable operation circuit.

DESCRIPTION OF CHARACTERS

Figure 1:
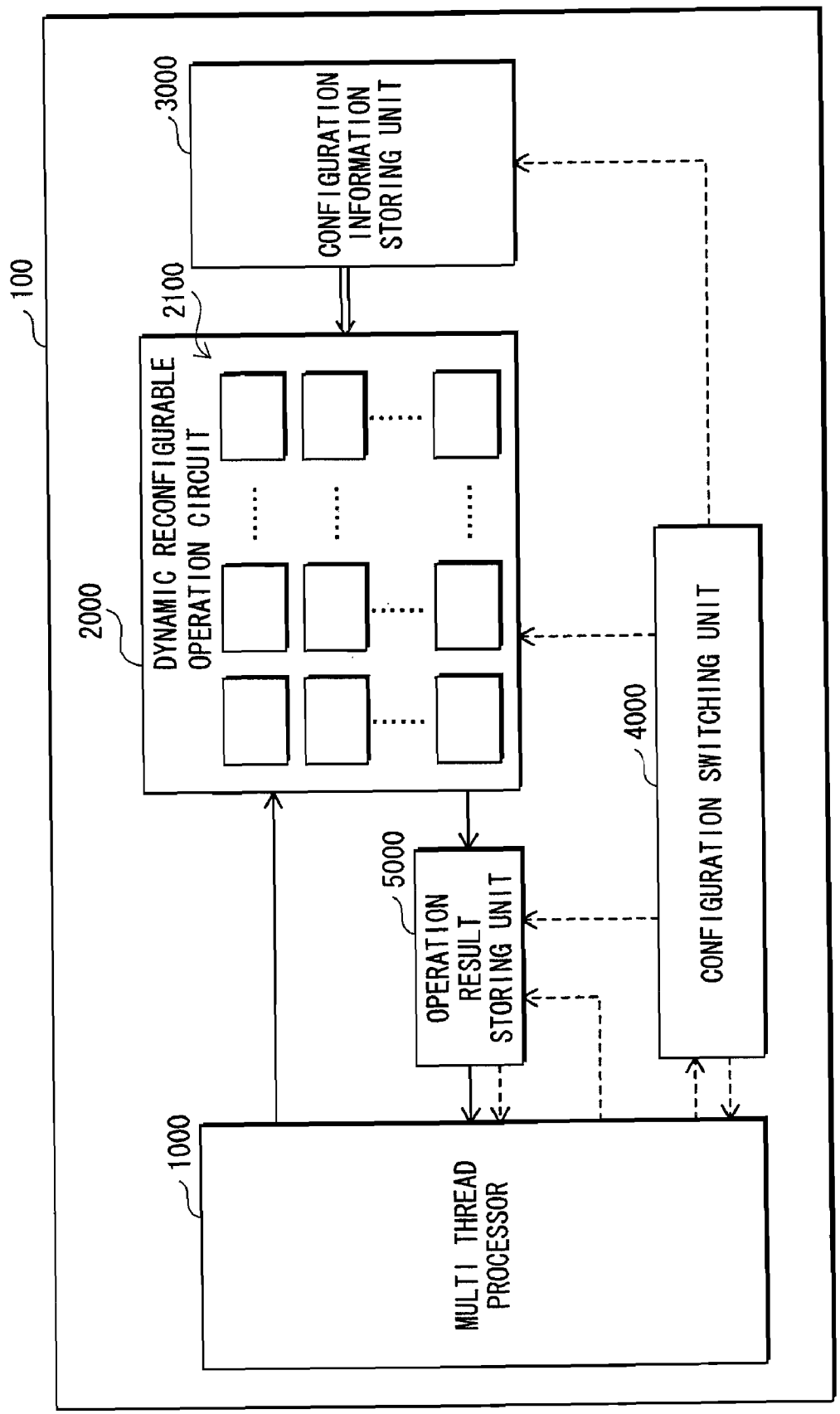
FIG. 1 shows an example of the configuration of a processor 100.

100 200 300 Processor
10 1000 Multi thread processor
20 2000 Dynamic reconfigurable operation circuit
21 2100 Operation cell
2200 Dynamic reconfiguration connector
2210 Operation source selector
2250 Output data selector
3000 Configuration information storing unit
3100 Operation cell configuration information table
4000 Configuration switching unit
4100 Operation cell row number table
4200 Thread row number table
5000 Operation result storing unit
6000 Operation result selector
7000 Operation source storing unit
10000 Mobile communication device

DETAILED DESCRIPTION OF THE INVENTION

First Embodiment

General Outline

A processor according to the present invention performs multi-threaded processing using a dynamic reconfigurable operation circuit, and reconfigures the dynamic reconfigurable operation circuit for a thread, each time the thread is executed. The dynamic reconfigurable operation circuit includes components such as a plurality of operation cells, and performs the reconfiguration of the dynamic reconfigurable operation circuit by reconfiguring the components.

A processor according to the present invention does not concurrently reconfigure all the operation cells for the next threads when switching threads. Instead, the processor sequentially reconfigures each of the operation cells that finished an operation.

Therefore, when switching threads, (i) an operation cell that is executing a process of a current thread, which is a thread before the thread switching, and (ii) an operation cell that is executing a process of a next thread, which is a thread after the thread switching exist together, resulting in the current and next threads being executed concurrently.

As described above, the process of the next thread starts before the process of the current thread ends. Therefore, the time period during which the operation cells are not being used is minimized, and the degradation of the operation performance due to the thread switching is reduced, which make it possible to shorten the whole execution time.

The following describes a processor of the first embodiment of the present invention.

The processor of the present embodiment is a multi thread processor using a round-robin method that realizes multi-threading. In the round-robin method, tasks are sequentially executed for each period of time.

Note that the tasks may be switched in an event-driven method in which the task switching is triggered by a signal, such as a data transfer complete signal of a data transfer controller DMAC (Direct Memory Access Controller), or an operation complete signal that is sent from other processors or a hardwired logic.

The threads repeatedly perform a series of processes (referred to as "loop" hereinafter) of inputting data to the dynamic reconfigurable operation circuit, executing the operations of a specified number of operation cells in a predetermined order, and outputting a result of the operations. The number of operation cells necessary for the series of processes is referred to as "operation row number".

The result that has been output is read by the multi thread processor via an operation result storing unit, and new data is input to the dynamic reconfigurable operation circuit.

The operation row numbers of the threads of the present invention are assumed to be different from each other. Therefore, the maximum number of loops that are executable in parallel is different for each thread, depending on the number of operation cells that constitute the dynamic reconfigurable operation circuit. Note that the number of loops that are to be actually executed is determined, depending on the content of a process of the thread.

<Configuration>

The following describes the configuration of a processor 100 according to the present invention, with reference to FIG. 1.

FIG. 1 shows an example of the configuration of the processor 100.

The processor 100 includes a multi thread processor 1000, a dynamic reconfigurable operation circuit 2000, a configuration information storing unit 3000, a configuration switching unit 4000, and an operation result storing unit 5000.

Figure 2:
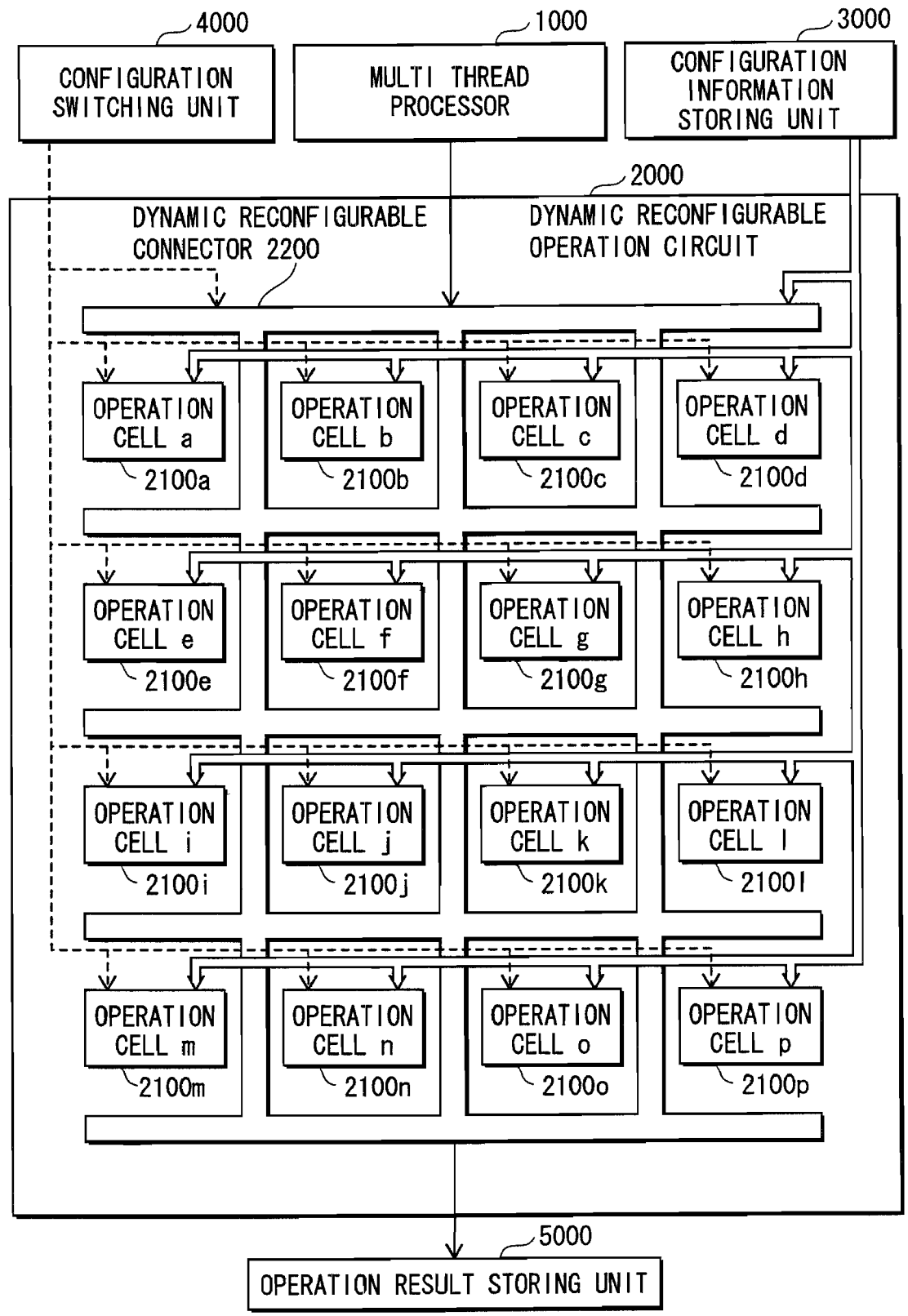
FIG. 2 is a schematic view showing the configuration of a dynamic reconfigurable operation circuit 2000.
Figure 3:
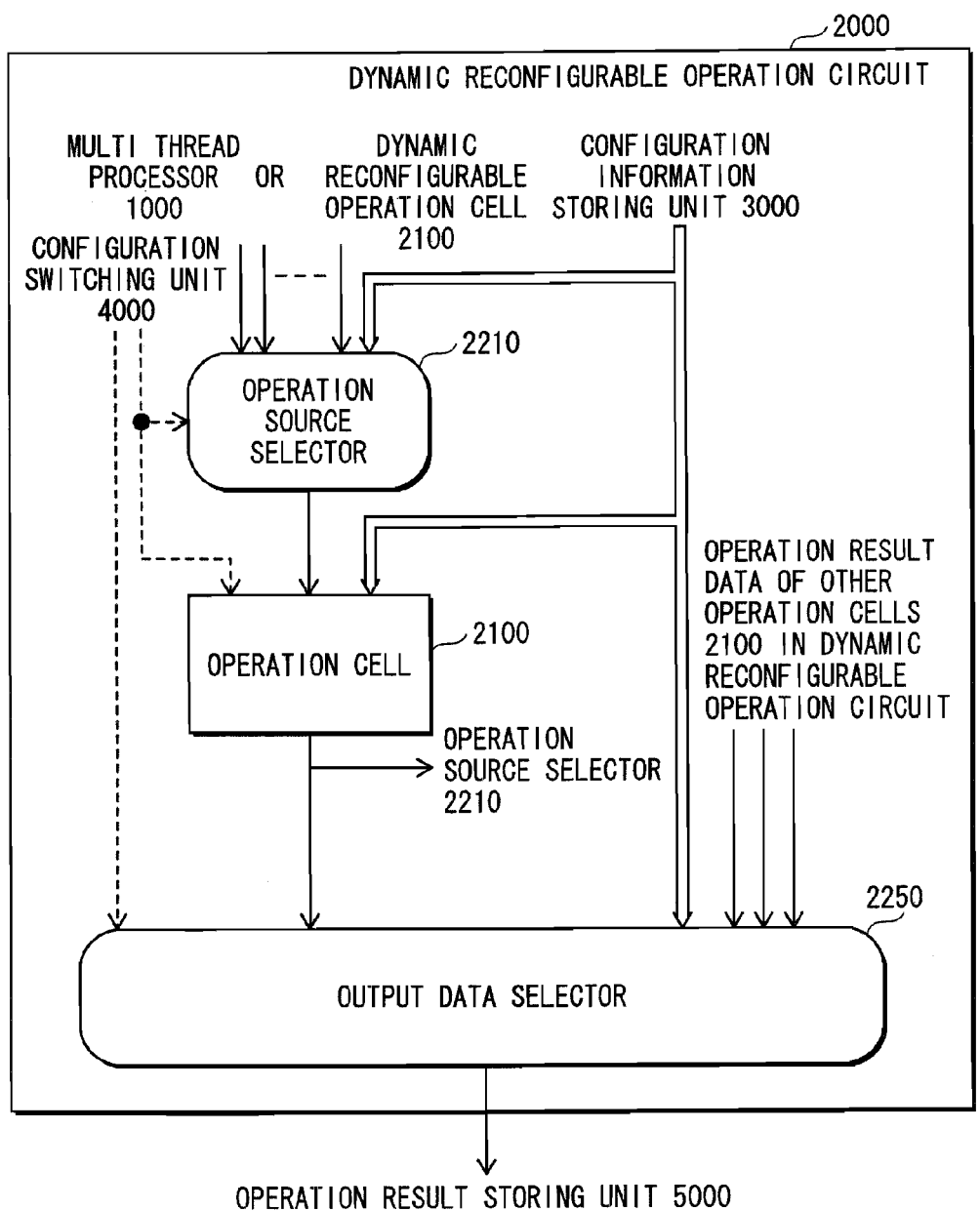
FIG. 3 shows an operation cell and a related dynamic reconfiguration connector.

Assume here that the arrow in a solid line indicates a flow of data including the operation results, the arrow in a dotted line indicates a flow of control signals and such, and the arrow in a double line indicates a flow of configuration information (same applies to FIGS. 2, 3 and such).

The multi thread processor 1000 is a so-called multi thread processor that executes a plurality of different processes in a time sharing system. The multi thread processor 1000 executes the processes of threads by performing operations with the dynamic reconfigurable operation circuit 2000.

Specifically, when executing the processing of a thread, the multi thread processor 1000 reconfigures the dynamic reconfigurable operation circuit for the thread, so that the dynamic reconfigurable operation circuit repeatedly executes the processes of the operation cells for the number of rows.

Furthermore, the multi thread processor 1000 determines a thread to be executed next, and execute the thread. Specifically, the multi thread processor 1000 instructs the configuration switching unit 4000 to detect time to switch threads by using a timer interrupt that notifies the end of the time allocated to the thread, and to reconfigure the dynamic reconfigurable operation circuit 2000 for the next thread. Also, the multi thread processor 1000 notifies the configuration switching unit 4000 about the current thread and the next thread.

Note that the detection of the time of the thread switching may be performed with use of the data transfer complete signal of the data transfer controller DMAC (Direct Memory Access Controller), or the operation complete signal that is sent from other processors or a hardwired logic. In the following description, the process performed when detecting the time of the thread switching is the same as the process performed when the time allocated to the thread elapses.

The dynamic reconfigurable operation circuit 2000 includes a plurality of operation cells 2100 arranged in array, and can change the configurations of the operation cells and the connection between the operation cells. In other words, the dynamic reconfigurable operation circuit 2000 reconfigures itself into a circuit that performs desired processes by reconfiguring the operation cells so that the operation cells perform predetermined operations, and reconfiguring the connection so that the operation cells can input predetermined data pieces. The detailed description thereof is provided below, with reference to FIGS. 2-5.

The configuration information storing unit 3000 stores configuration information for configuring the dynamic reconfigurable operation circuit 2000 into a desired circuit. Also, the configuration information storing unit 3000 sequentially reads necessary configuration information and supplies the necessary configuration information to the dynamic reconfigurable operation circuit 2000, upon receiving an instruction from the configuration switching unit 4000.

The configuration information in the present embodiment is assumed to be stored for each thread and for each operation cell. The detailed description is provided below with reference to FIG. 10.

The configuration switching unit 4000 sequentially reconfigures the dynamic reconfigurable operation circuit 2000 for the next thread upon receiving an instruction from the multi thread processor 1000. The reconfiguration is performed when the configuration switching unit 4000 controls the operation result storing unit 5000, the dynamic reconfigurable operation circuit 2000, and the configuration information storing unit 3000.

The operation result storing unit 5000 stores an operation result that is output by the dynamic reconfigurable operation circuit 2000.

The operation result, which is a result of the operation of one loop in each thread, is stored for each thread and read by the multi thread processor 1000.

In the present embodiment, the operation result is written for each loop, and read by the multi thread processor 1000. Also, the operation result is read and used when time is allocated to the thread again for continuing a process of the thread.

The operation result storing unit 5000 changes a write region of the dynamic reconfigurable operation circuit 2000 and a read region of the multi thread processor 1000, when notified by the configuration switching unit 4000 about the current thread and the next thread.

The following is a detailed description of the dynamic reconfigurable operation circuit 2000, with reference to FIGS. 2-5.

<Details of Dynamic Reconfigurable Operation Circuit 2000>

FIG. 2 is a schematic view showing the configuration of the dynamic reconfigurable operation circuit 2000.

The dynamic reconfigurable operation circuit 2000 includes a plurality of operation cells (2100a-2100p) and a dynamic reconfiguration connector 2200 that connects the operation cells.

Hereinafter, each of the operation cells, namely the operation cells 2100a, 2100b, . . . are respectively referred to as "operation cell a", "operation cell b", . . . , and the same applies to FIG. 4 onward. Also, the operation cell 2100 indicates one operation cell.

Each of the operation cells 2100 is connected to the signal line of the configuration switching unit 4000 and the signal line of the configuration information storing unit 3000. The configuration switching unit 4000 sends a control signal (arrow in a dotted line), and the configuration information storing unit 3000 sends configuration information (arrow in a double line).

Also the operation cell 2100 receives, from the multi thread processor 1000, operation data necessary for the operation cell 2100 and such, via the dynamic reconfiguration connector 2200.

The operation cell 2100 performs multiplication, shifting, addition, and a logic operation, according to the configuration information that has been set. A period required for the performance of one operation in the operation cell 2100 is assumed to be one cycle of the processor, and a period required for reconfiguration is also assumed to be one cycle of the processor.

The following describes the configuration of the dynamic reconfiguration connector 2200, with reference to FIG. 3.

<Dynamic Reconfiguration Operation Connector 2200>

FIG. 3 shows the operation cell 2100 and the dynamic reconfiguration connector 2200 related thereto.

Specifically, this figure shows the operation cell 2100 and an operation source selector 2210 that are paired, and an output data selector 2250.

The dynamic reconfiguration connector 2200 includes the operation source selectors 2210 paired with the operation cells 2100, namely the same number of the operation source selectors 2210 as the number of the operation cells 2100, one output data selector 2250, a wiring of data sent from the multi thread processor 1000 and a wiring connecting between the operation cells.

The operation cell 2100, operation source selector 2210, and output data selector 2250 receive (i) control signals from the configuration switching unit 4000, and (ii) the configuration information from the configuration information storing unit 3000. This makes it possible for the operation cells 2100 and such to switch the configurations thereof at different timings.

The operation source selector 2210 inputs operation data pieces that are the operation results of other operation cells 2100, selects one operation data piece from among the operation data pieces that have been input, and outputs the selected operation data piece to the corresponding operation cell 2100.

Note that the operation cells a-d in the first row select one of (i) operation data of the other operation cells 2100 and (ii) operation data of the multi thread processor 1000.

The configuration of the operation source selector 2210 is switched the same as the corresponding operation cell 2100.

Therefore, the operation source selector 2210 and the corresponding operation cell 2100 share the same switch signal line of the configuration switching unit 4000.

Also, the operation cell 2100 outputs the operation data of the operation result to the operation source selectors 2210 of the other operation cells 2100. Note that the operation cells m-p in the bottom row output the operation data to the other operation cells 2100 and the output data selector 2250.

The output data selector 2250 selects necessary operation data piece from among the operation data pieces that have been input by the operation cells, and outputs the selected data piece to the operation result storing unit 5000.

The output data selector 2250 is, as is the case with the operation cells 2100, connected to (i) the configuration switching unit 4000 via the signal line for switching the configuration, and (ii) the configuration information storing unit 3000 via the signal line for transferring the configuration information. Upon receipt of the signal for switching the configuration, the output data selector 2250 switches the configuration thereof according to the configuration information received from the configuration information storing unit 3000 at the same time.

<Flow of Configuration Information, Control Signal, and Operation Data>

Figure 4:
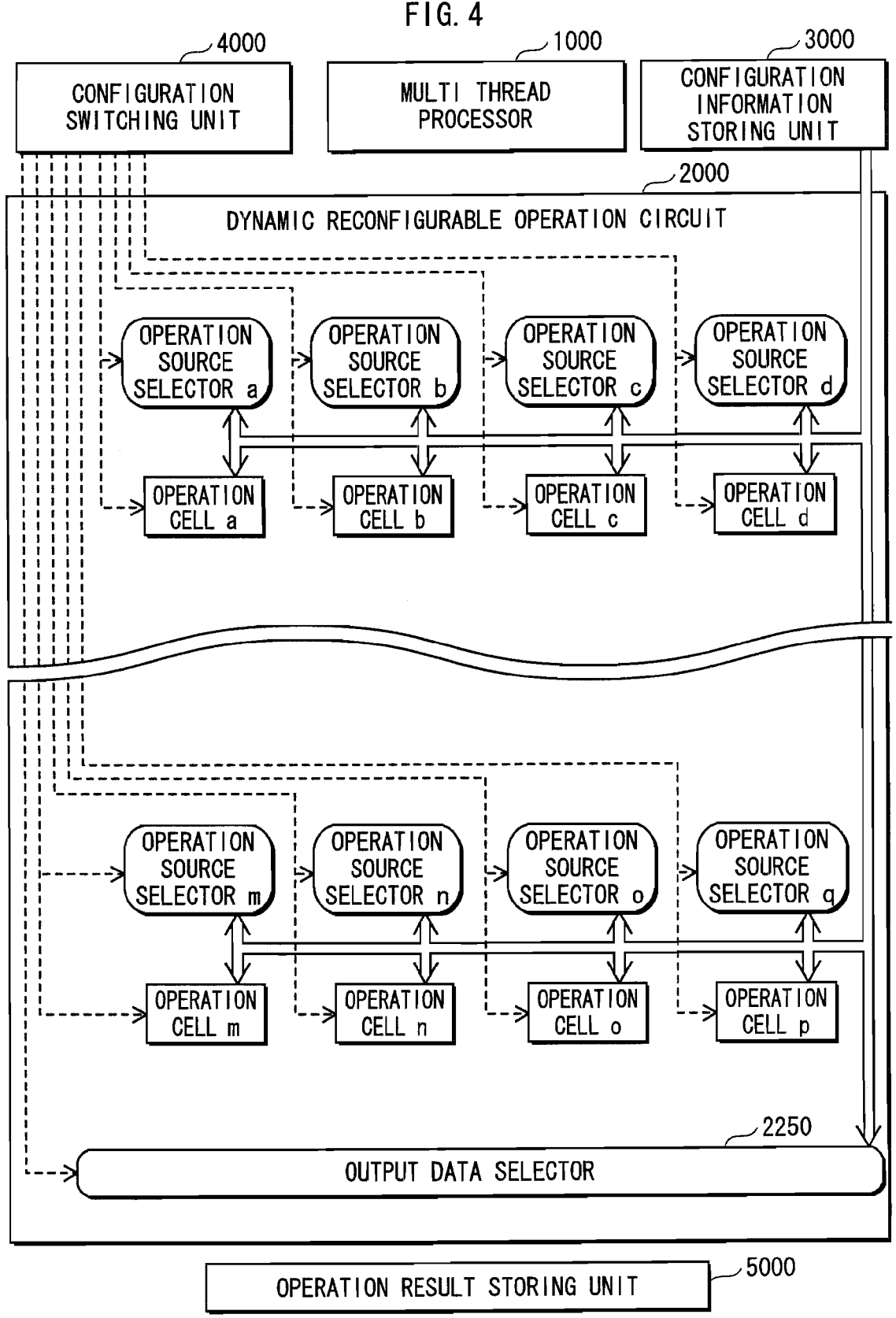
FIG. 4 shows signal lines that supply configuration information and a control signal to the operation cells, operation source selectors, and an output data selector.
Figure 5:
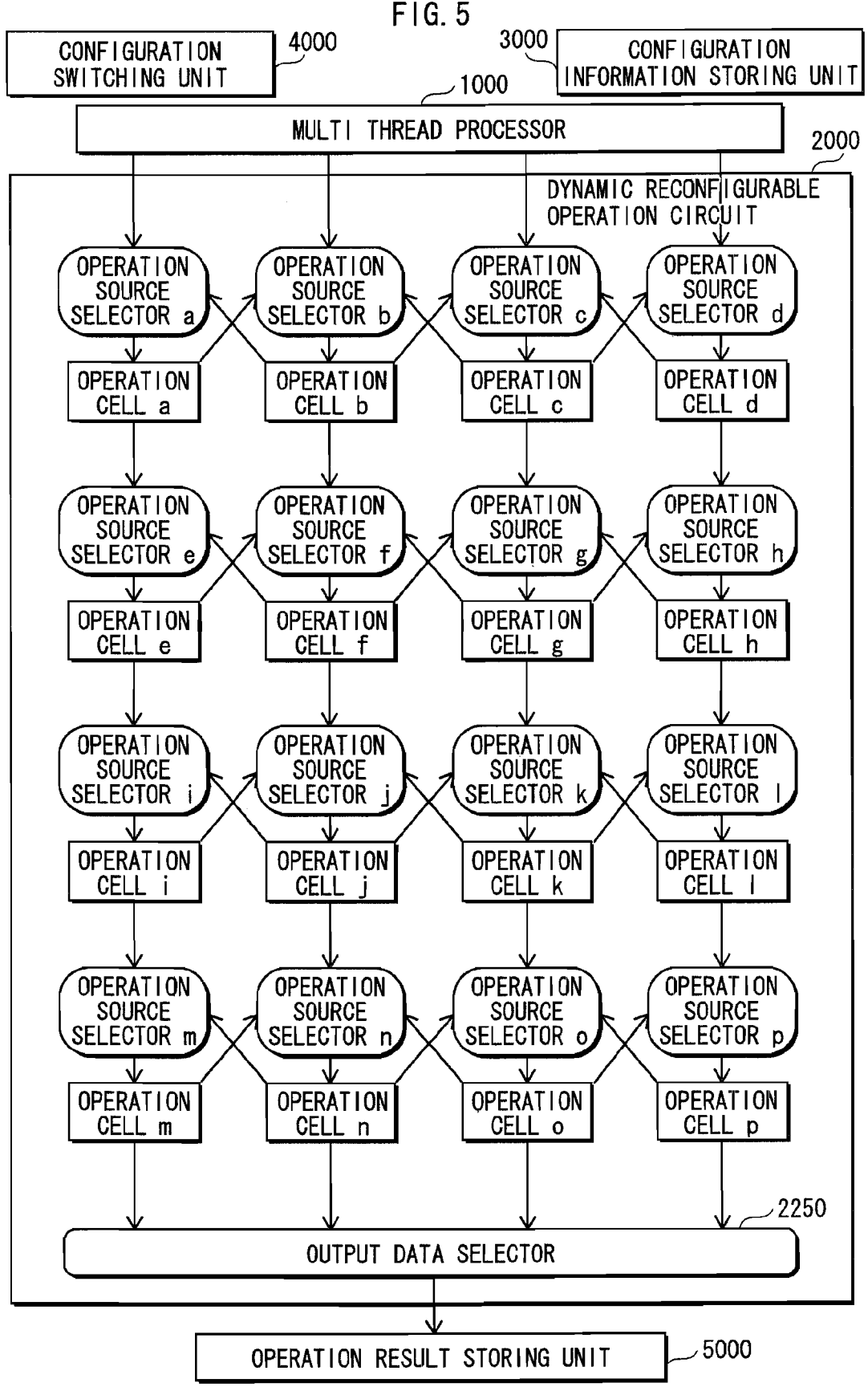
FIG. 5 shows signal lines that supply operation data to the operation cells.

FIG. 4 shows the signal lines that supply the configuration information and the control signal, to the operation cells, operation source selectors, and output data selector, and FIG. 5 shows the signal lines that supply the operation data.

In FIG. 4, the configuration switching unit 4000 outputs the control signals, and the configuration information storing unit 3000 outputs the configuration information, respectively to (i) the operation cells a-p, (ii) the operation source selectors a-p, and (iii) the output data selector 2250.

The operation cell 2100 and operation source selector 2210 corresponding thereto receive the same control signal and the same configuration information. Also, the configuration information storing unit 3000 concurrently sends the same configuration information to all the operation cells 2100 and such.

The operation cells 2100, operation source selectors 2210, and output data selector 2250 read the configuration information and perform reconfiguration, according to the control signals sent by the configuration switching unit 4000.

In other words, the configuration switching unit 4000 causes the configuration information storing unit 3000 to output the configuration information of an operation cell whose configuration is to be changed, and also sends an instruction of reconfiguration only to the operation cell whose configuration is to be changed. The operation cell that has received the instruction of reconfiguration reads the configuration information and performs reconfiguration.

The same applies to the operation source selector 2210 and the output data selector 2250.

FIG. 5 shows the flow of the operation data, such that each of the operation cells 2100 sends the operation data of the operation result to the operation source selector 2210 of an operation cell in the next row, and the operation source selector 2210 of the adjacent operation cell. For example, the operation cell b outputs the operation data to the operation source selector f, the operation source selector a, and the operation source selector c.

The operation source selector 2210 selects one of a plurality of operation data pieces that have been input, and outputs the selected operation data piece to the corresponding operation cell. For example, the operation source selector f selects one of the operation data pieces sent by the operation cell b, operation cell e, and operation cell g, and outputs the selected operation data piece to the operation cell f. The operation cell f performs an operation based on the operation data piece that has been sent by the operation source selector f.

The operation source selector 2210 determines which operation data piece to select based on the configuration thereof. For example, in a case where the operation source selector f has a configuration for selecting an operation data piece sent by the operation cell g, the operation source selector f performs reconfiguration by always selecting the operation data piece sent by the operation cell g. Then, based on the configuration that has been reconfigured, the operation source selector f selects one of data pieces sent by the operation cell b and the operation cell e.

The output data selector 2250 also determines, based on the configuration thereof, which operation data piece to output to the operation result storing unit 5000, from among the data pieces that have been input. In other words, the operation data to be output to the operation result storing unit 5000 is not always one operation data piece, and determined by the configuration of the output data selector 2250 that is configured for the process of a thread.

Also, in the present embodiment, the operation data of one of the operation cell 2100 is sent to the operation source selectors of the operation cells 2100 that are on both sides of the one of the operation cell 2100 in the same row, and the operation cell 2100 in the next row. However, it is not limited to such. Instead, the operation data may of course be sent to the other operation cells and operation source selectors.

<Data>

The following describes data used by the processor 100 when switching threads, with reference to FIGS. 9 and 10.

Figure 6:
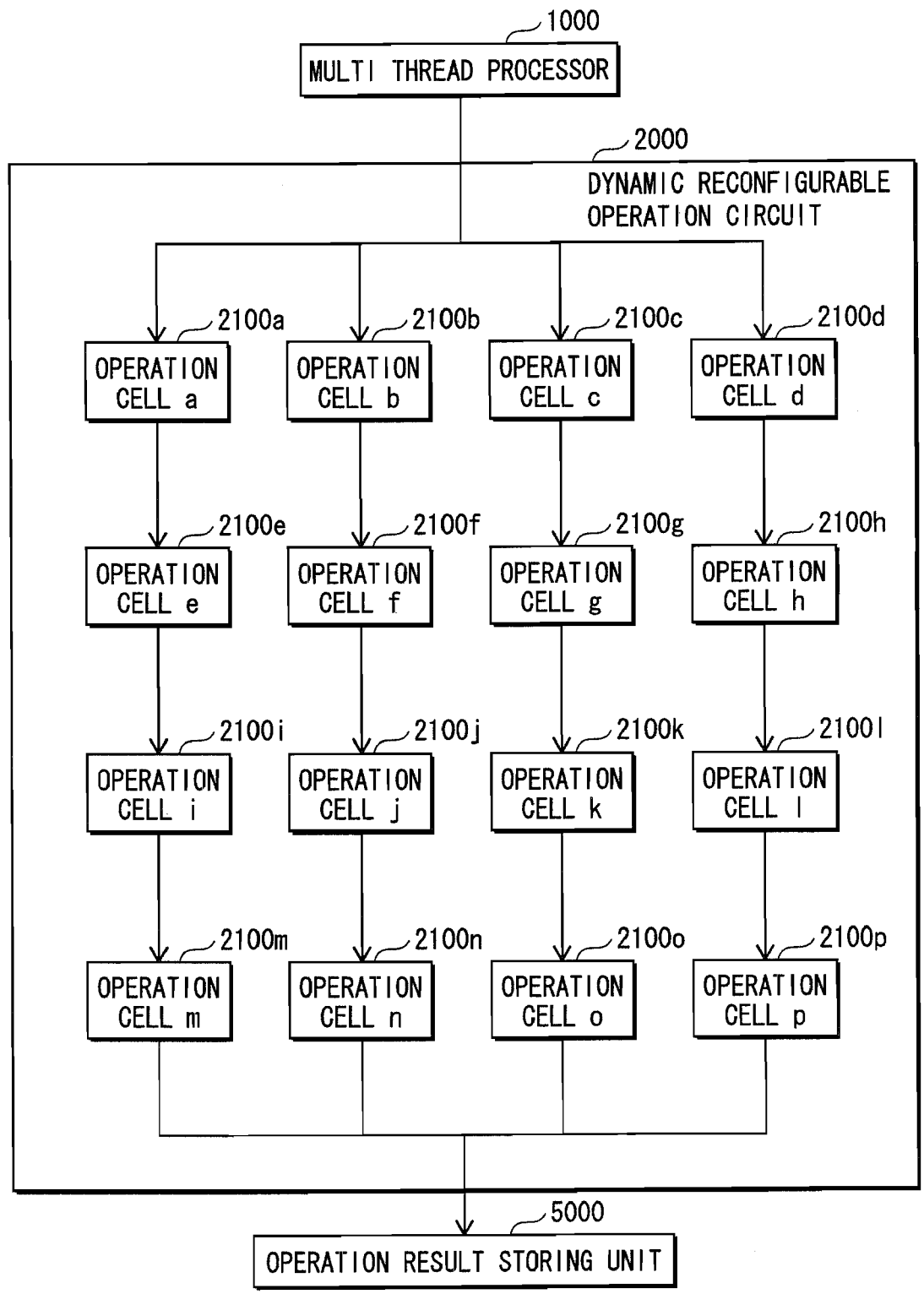
FIG. 6 shows the data flow of thread A.
Figure 7:
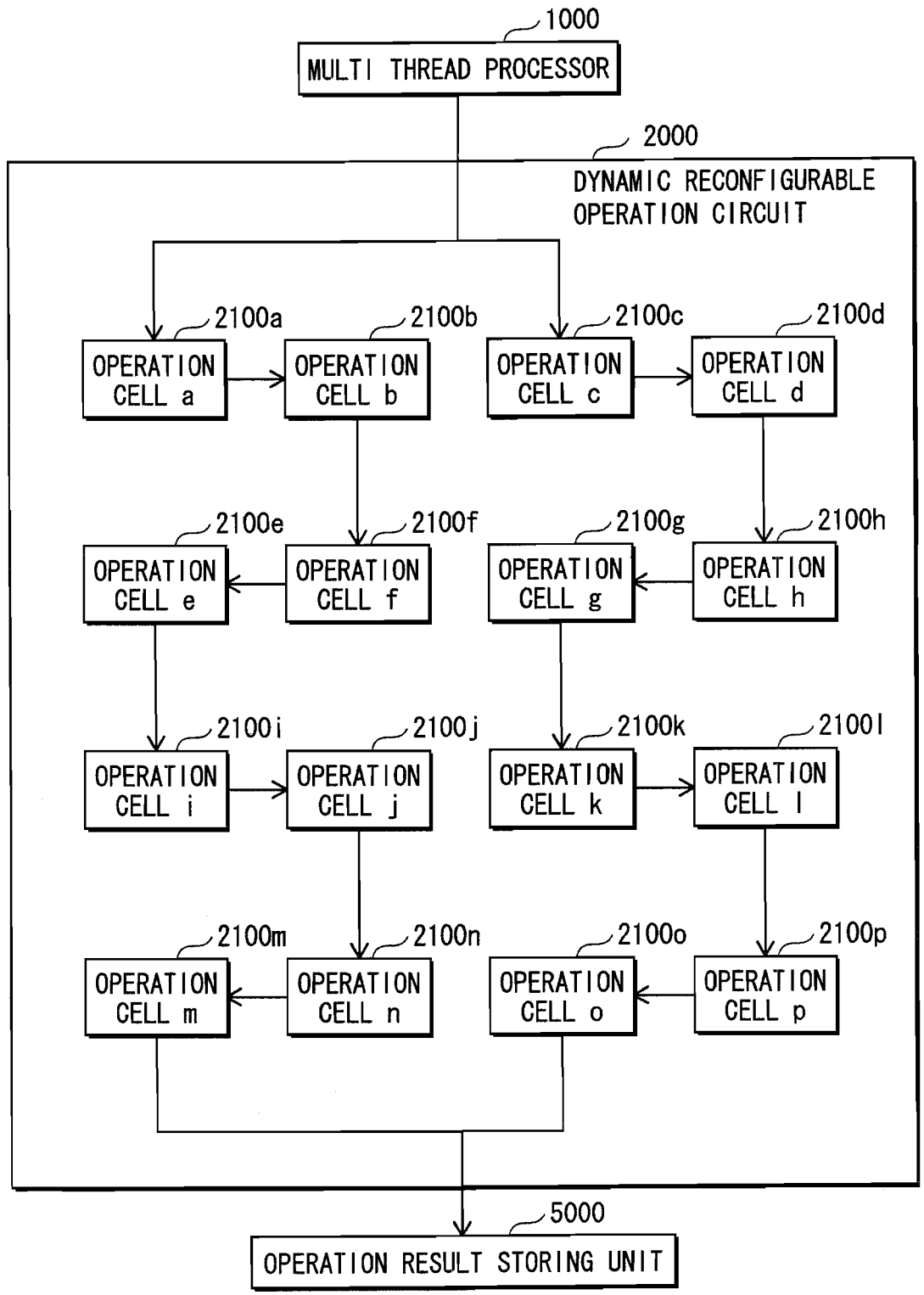
FIG. 7 shows the data flow of thread B.
Figure 8:
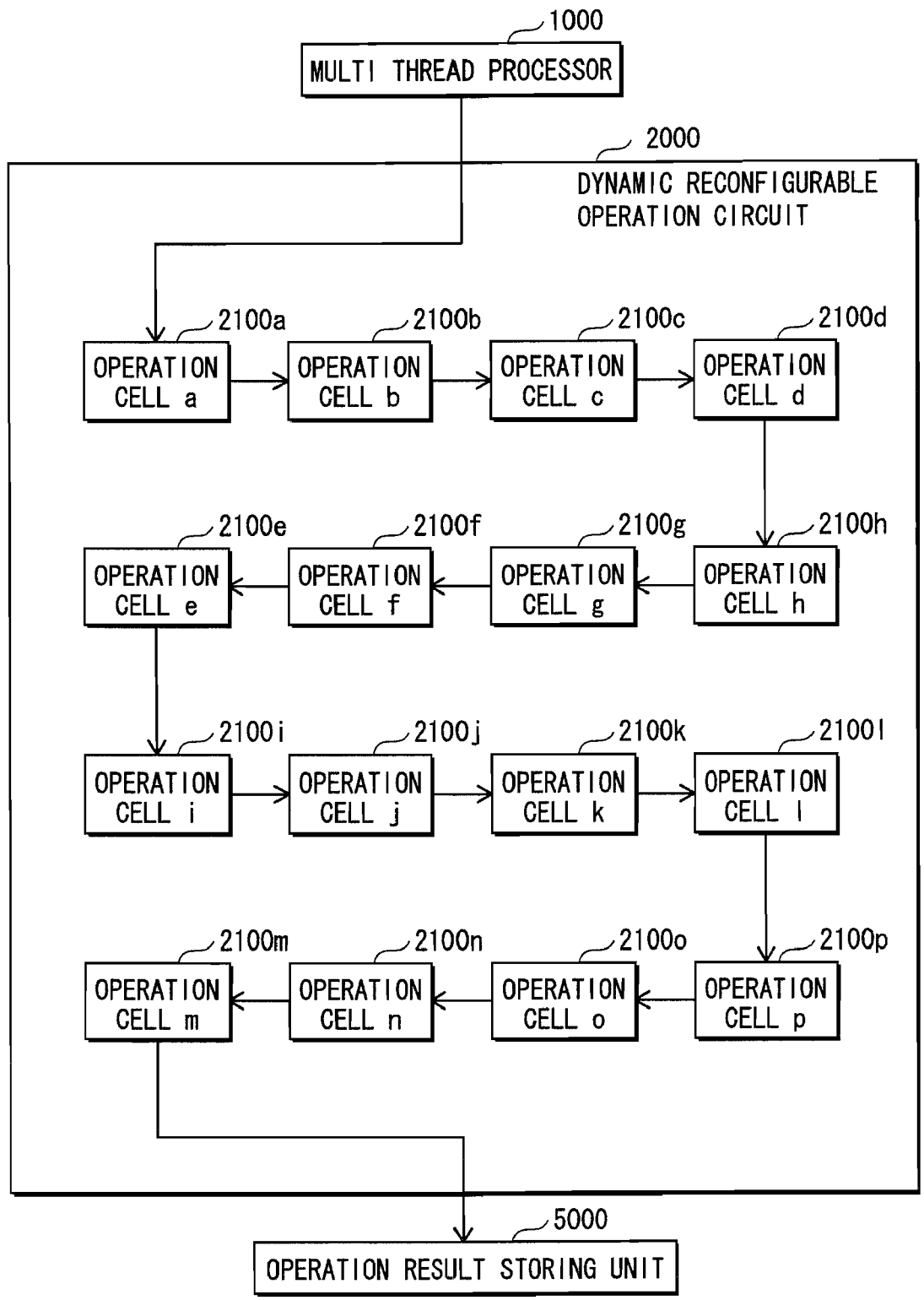
FIG. 8 shows the data flow of thread C.

Before describing the data used by the processor 100, a description is given of threads used in the present embodiment, with reference to FIGS. 6-8.

<Threads>

In the present embodiment, three threads, namely a thread A, thread B, and thread C are assumed to be cyclically executed.

FIGS. 6-8 show the data flows of the threads A-C. For the convenience of the description, each of the figures only shows the flow of the operation data, and does not show the operation source selectors 2210 and the output data selector 2250.

FIG. 6 shows the data flow of the thread A. The number of rows of the operations (hereinafter referred to as operation row number) in the thread A is "four", and there are 16 operation cells in the dynamic reconfigurable operation circuit 2000. Therefore, in the thread A, four operations are assumed to be performed in parallel.

In other words, upon receipt of an operation source from the multi thread processor 1000, the operation cell a sends an operation result thereof to the operation cell e. Upon receiving operation data from the operation cell a, the operation cell e performs an operation based on the operation data, and sends the operation result to the operation cell i. Upon receiving the operation data from the operation cell e, the operation cell i performs an operation based on the operation data. As described above, each operation result is sequentially sent from one operation cell to another, and the operations are performed up to the operation cell m. In the same manner, the operation cells b, c, d receive the operation source from the multi thread processor 1000, and perform the respective processes in parallel.

The operation results of the operation cells m, n, o, and p are stored in the operation result storing unit 5000.

The operation results that have been stored are read by the multi thread processor 1000, and used for the operations performed in the multi thread processor 1000. Note that the operation results may be supplied to the operation cell a and such. The multi thread processor 1000 executes the thread A, by repeating a loop of reading the operation data and performing an operation. The data supplied to the operation cells 2100 may be the exact operation data that has been read, operation data on which a certain process has been performed, or other data, depending on a process of the thread. The above-described loop is also repeated by the thread B and thread C.

FIG. 7 shows the data flow of the thread B. The operation row number of the thread B is "eight". Therefore, two operation processes are performed in parallel.

One of the operation processes is performed as follows. First, the operation source is sent by the multi thread processor 1000 to the operation cell a. Then, the operation data is sent in order of the operation cell a, operation cell b, operation cell f, operation cell e, operation cell i, operation cell j, operation cell n, and operation cell m. In the same manner, the other operation process is performed by the operation source being sent to the operation cell c by the multi thread processor 1000, and the operation data being sent up to the operation cell o.

The operation results of the operation cells m and o are stored in the operation result storing unit 5000.

FIG. 8 shows the data flow of the thread C. The operation row number of the thread C is "16", and therefore one operation process is performed in the below-described manner.

First, the operation source is sent by the multi thread processor 1000 to the operation cell a. Then, the operation data is sent in order of the operation cell a, operation cell b, operation cell c, operation cell d, operation cell h, operation cell g, operation cell f, operation cell e, operation cell i, operation cell j, operation cell k, operation cell l, operation cell p, operation cell o, operation cell n, and operation cell m.

The operation result of the operation cell m is stored in the operation result storing unit 5000.

<Data Used for Thread Switching>

The following describes data used for thread switching in a case where the thread A, thread B, and thread C are cyclically executed, with reference to FIGS. 9 and 10.

FIG. 9A shows the configuration of an operation cell row number table that shows the number of rows of the operation cells, and an example of the content of the operation cell row number table, and FIG. 9B shows the configuration of a thread row number table that shows the number of rows of the threads, and an example of the content of the thread row number table.

The data shown in FIGS. 9A and 9B is preliminarily stored in the configuration switching unit 4000.

First, a description is given of the operation cell row number table 4100 shown in FIG. 9A.

The operation cell row number table 4100 includes thread IDs 4110 and operation cell IDs 4120, and shows operation sequence numbers 4130 of operation cells for each thread.

The thread IDs 4110 are identifiers of the threads that are to be executed in the processor. In the present embodiment, the thread IDs 4110 are "thread A", "thread B", and "thread C".

The operation cell IDs 4120 are identifiers of the operation cells 2100 included in the dynamic reconfigurable operation circuit 2000 of the processor. In the present embodiment, there are 16 operation cell IDs 4120, namely "operation cell a"-"operation cell p".

The operation sequence number 4130 of an operation cell for each thread indicates at which position from the beginning the operation cell is to be executed in the process of one loop of the thread. Note here that the operation sequence numbers are shown by the numbers "0" to "15", and the operation cell having the operation sequence number "0" is to be executed first.

For example, the operation sequence number 4130 of an operation cell whose operation cell ID 4120 is "operation cell b", in a thread whose the thread ID 4110 is "thread A", is "0". Therefore, the operation cell b is executed first in the thread A (see FIG. 6). Also, the operation sequence number 4130 of an operation cell whose operation cell ID 4120 is "operation cell b", in a thread whose thread ID 4110 is "threadB", is "1". Therefore, the operation cell b is executed second in the thread B (see FIG. 7).

A thread row number table 4200 shown in FIG. 9B includes thread IDs 4210 and operation row numbers 4220.

The thread IDs 4210 are the same as the thread IDs 4110 in FIG. 9A.

The operation row number 4220 indicates the number of rows of operations in each thread. For example, the operation row number 4220 of a thread whose thread ID 4210 is "threadA" is four. Therefore, the operations are performed using four operation cells in sequence. Also, the operation row number 4220 of a thread whose thread ID 4210 is "thread C" is 16. Therefore, the operations are performed using 16 operation cells in sequence. The order of the sequence is shown by the operation cell row number table 4100 (see FIG. 9A).

FIG. 10 shows the configuration of a table of an operation cell configuration information table 3100 and an example of the content of the table 3100, and this data is stored in a configuration information storing unit 3000 in advance.

The operation cell configuration information table 3100 includes thread IDs 3110 and operation IDs 3120, and shows configuration information names 3130 that specify the configuration information of the operation cells for each thread. In other words, the configuration information name 3130 is an identifier of the configuration information.

In the operation cells whose operation cell IDs 3120 are "operation cell a" to "operation cell p", the configuration information identified by the configuration information name 3130 is for reconfiguring the operation cells and the corresponding operation source selectors.

The operation cell configuration information table 3100 further stores the configuration information name 3130 that specifies the configuration information of the output data selectors for each thread.

The configuration information storing unit 3000 stores all the configuration information pieces indicated by the configuration information names 3130.

For example, the configuration information name 3130 of an operation cell whose operation cell ID 3120 is "operation cell a", in a thread whose thread ID 3110 is "threadA", is "configuration information A0". Therefore, the operation cell a and the operation source selector a during the execution of the thread A are reconfigured using the configuration information indicated by "configuration information A0".

The configuration information storing unit 3000 receives an instruction from the configuration switching unit 4000, and sends, to the dynamic reconfigurable operation circuit 2000, the configuration information indicated by the configuration information name 3130 corresponding to the instruction, according to the operation cell configuration information table 3100.

<Operation>

The following describes the operation of a processor according to the present invention, with reference to FIGS. 11-27.

Figure 11:
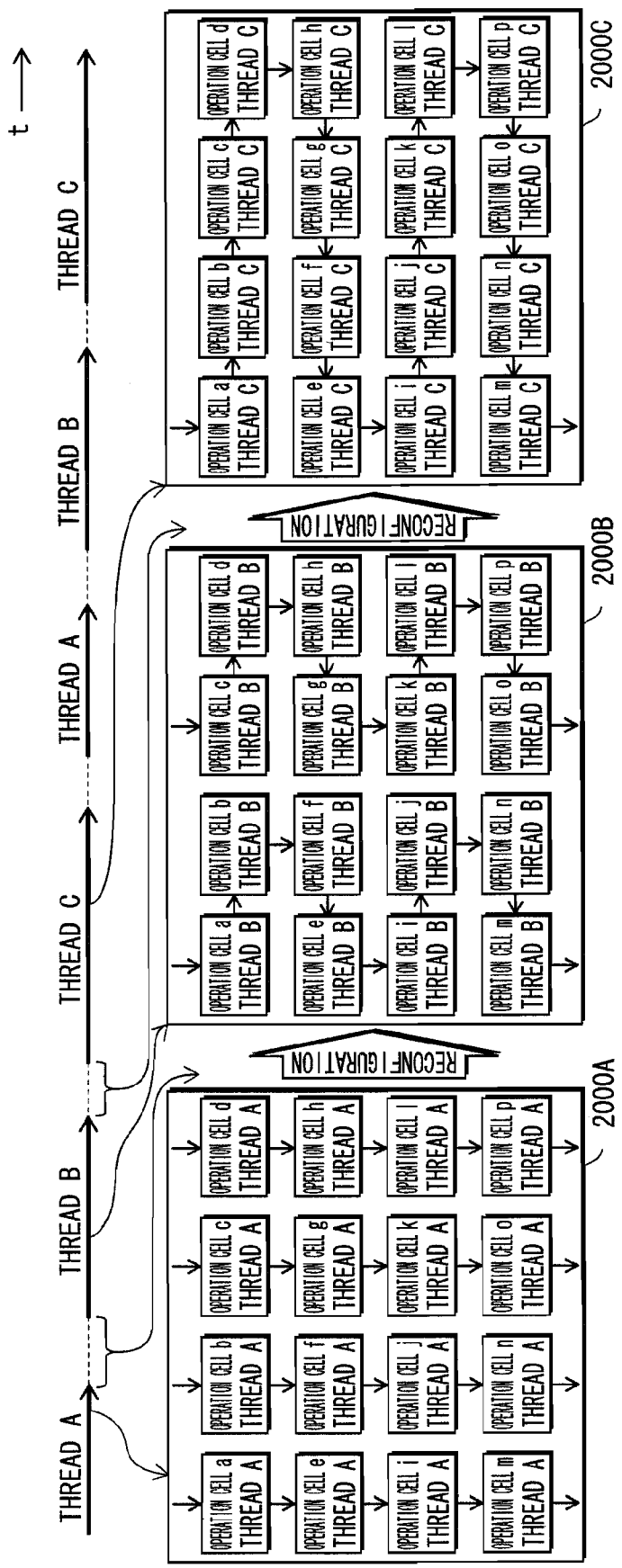
FIG. 11 shows conventional thread switching.
Figure 12:
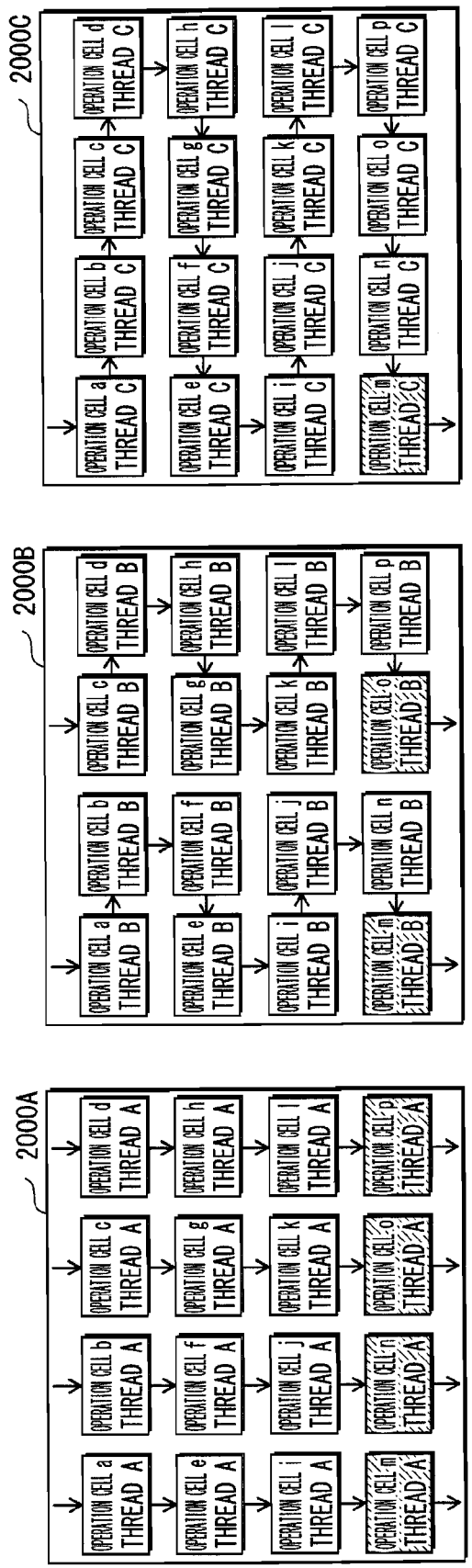
FIG. 12 shows operation cells 2100 that are executed in the last cycle of time allocated to each thread.
Figure 13:
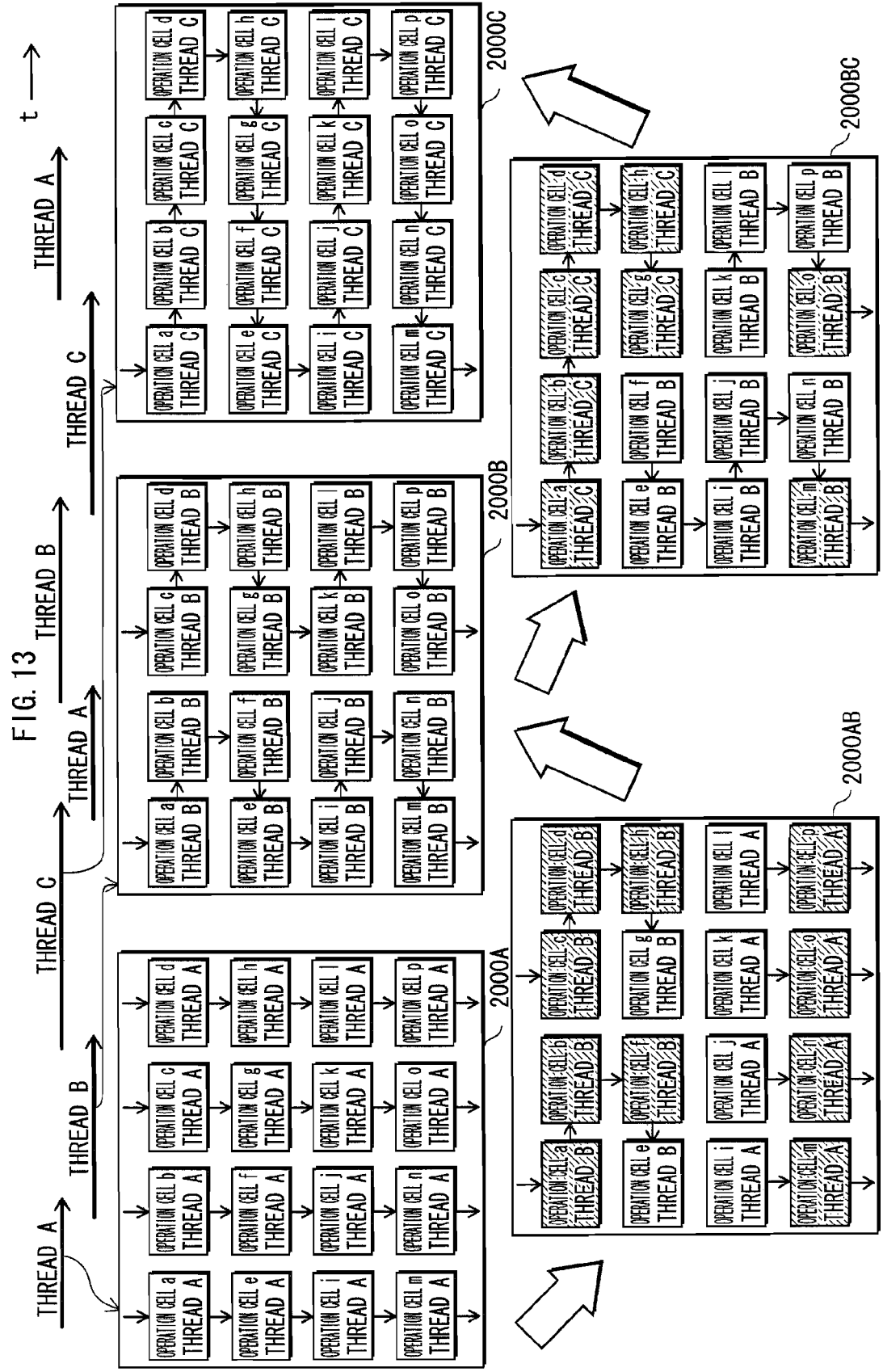
FIG. 13 shows the thread switching of the present invention.

First, a brief description of thread switching is given by comparing the conventional technology and the present invention, with reference to FIGS. 11-13.

Then, a description is given of the thread switching of the present invention where a thread is switched to another thread whose operation row number 4220 (see FIG. 9B) is different from the thread. The description is divided into two cases, namely (i) the case of switching the current thread that is currently being executed to a thread whose operation row number is larger than that of the current thread, and (ii) the case of switching the current thread to a thread whose operation row number is smaller than that of the current thread.

The operation and reconfiguration of each operation cell 2100 in the dynamic reconfigurable operation circuit 2000 are performed in one cycle of the processor.

<Thread Switching of Conventional Technology and Present Invention>

FIG. 11 shows a thread switching of the conventional technology.

FIG. 11 shows the dynamic reconfigurable operation circuit 2000 at the time of thread switching, while the processor 100 cyclically executes the thread A, thread B, and thread C.

A dynamic reconfigurable operation circuit 2000A is the dynamic reconfigurable operation circuit 2000 during the execution of the thread A. In the same manner, a dynamic reconfigurable operation circuit 2000B is the dynamic reconfigurable operation circuit 2000 during the execution of the thread B, and a dynamic reconfigurable operation circuit 2000C is the dynamic reconfigurable operation circuit 2000 during the execution of the thread C.

FIG. 11 also shows for which thread each of the operation cells 2100 in the dynamic reconfigurable operation circuit 2000 is configured. For example, "thread A" described under "operation cell a" in the dynamic reconfigurable operation circuit 2000A indicates that the configuration of the operation cell a is for the thread A.

Conventionally, when the execution of the thread A has completed, the dynamic reconfigurable operation circuit 2000A is reconfigured into the dynamic reconfigurable operation circuit 2000B, so that the thread B is executed. Therefore, while the dynamic reconfigurable operation circuit 2000A is being reconfigured into the dynamic reconfigurable operation circuit 2000B, the threads cannot be executed.

FIG. 12 shows the operation cells 2100 that are executed in the last cycle of time allocated to each thread. In other words, FIG. 12 shows the dynamic reconfigurable operation circuit 2000 immediately before the reconfiguration of each thread in FIG. 11.

In the dynamic reconfigurable operation circuit 2000A, the operation cell 2100 indicated by cross-hatching is executed in the last cycle of time allocated to the thread A. In the same manner, the operation cells 2100 indicated by cross-hatching in the dynamic reconfigurable operation circuits 2000B and 2000C are of the threads B and C respectively.

In other words, the operation cells 2100 that are not hatched, namely 12 operation cells in the thread A, 14 operation cells in the thread B, and 15 operation cells in the thread C, are not performing any operations during the execution of the hatched operation cells.

In FIG. 12, descriptions are given of the last cycle of time allocated to each thread. Note that an operation cell that has completed an operation at the last loop in time allocated to a thread does not perform any operations until the execution of the thread is completed. For example, after sending, to the operation cell e, an operation result of the last operation, the operation cell a of the dynamic reconfigurable operation circuit 2000A does not perform any operations until the operation of the operation cell m is completed.

The present invention aims to reconfigure the operation cells that are available at the time of the thread switching, into the configuration for the next thread, so that the operation cells that have been reconfigured can perform a process of the next thread.

FIG. 13 shows the thread switching of the present invention.

The operation cells are sequentially reconfigured for the thread B, beginning from an operation cell that has completed the execution of the thread A, and performs the operations of the thread B.

Therefore, when the dynamic reconfigurable operation circuit 2000A is being reconfigured into the dynamic reconfigurable operation circuit 2000B, as shown in a dynamic reconfigurable operation circuit AB, there is a period where the operation cells for the thread A and the operation cells for the thread B both exist before all the operation cells 2100 are reconfigured into the configuration for the thread B. This means that the thread A and the thread B are executed in parallel.

In the same manner, when the thread B is being switched to the thread C, there is a period where the operation cells for the thread B and the operation cells for the thread C both exist, as shown in a dynamic reconfigurable operation circuit 2000B.

As described above, time for the reconfiguration of the operation cells 2100, which is necessary for the thread switching, can be eliminated by performing the processes in parallel. Also, it is more efficient when parts of the execution of threads are performed in parallel.

Specifically, time for the reconfiguration necessary between threads, which is shown in FIG. 11, is not necessary. Furthermore, the end of the process of the current thread coincides with the start of the next thread, which means that the thread execution time on the whole can be shorten.

<When Switching to Thread Having Operation Row Number Larger than that of Current Thread>

Figure 14:
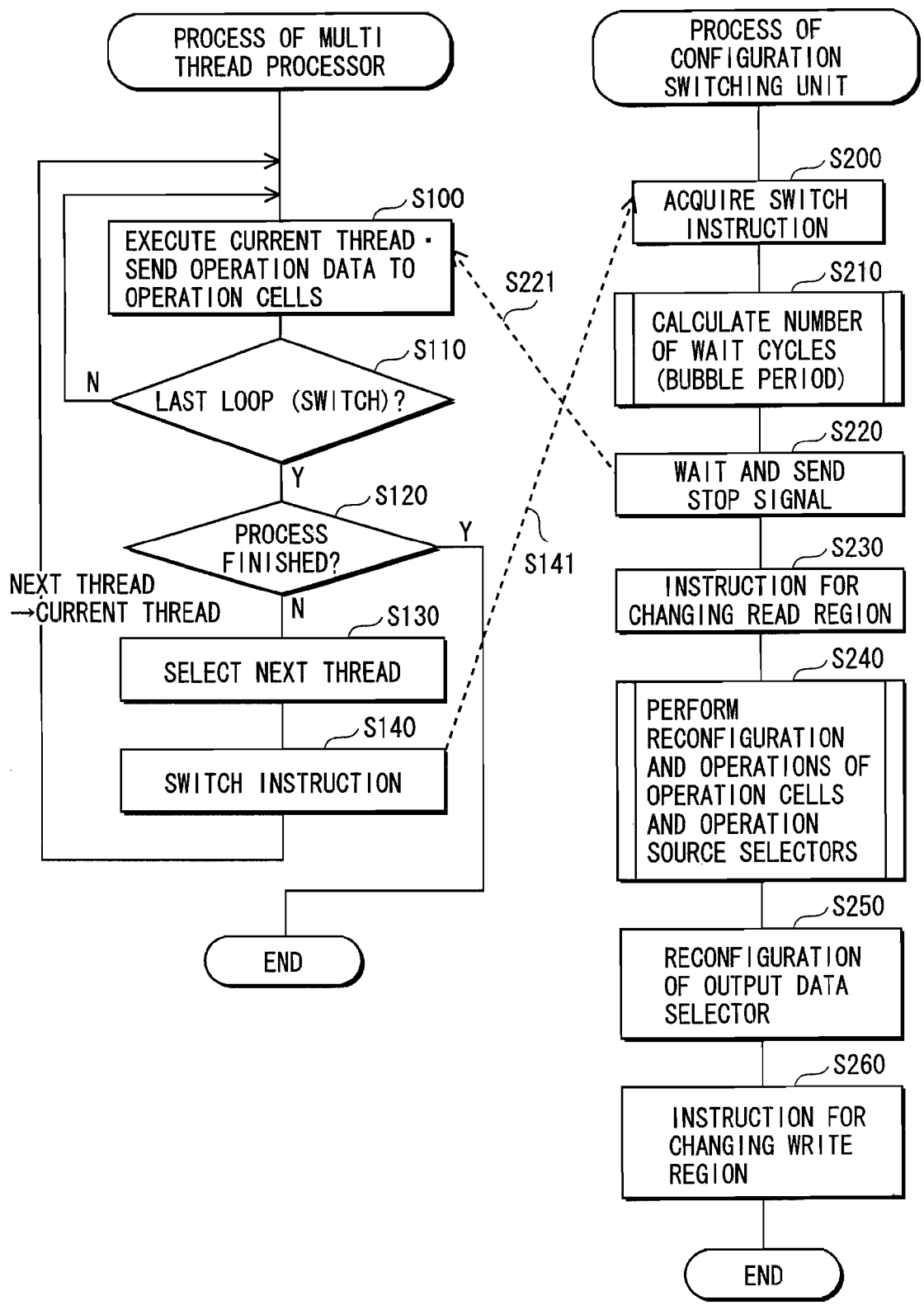
FIG. 14 is a flow chart showing the processes of a multi thread processor 1000 and a configuration switching unit 4000 when switching threads.
Figure 15:
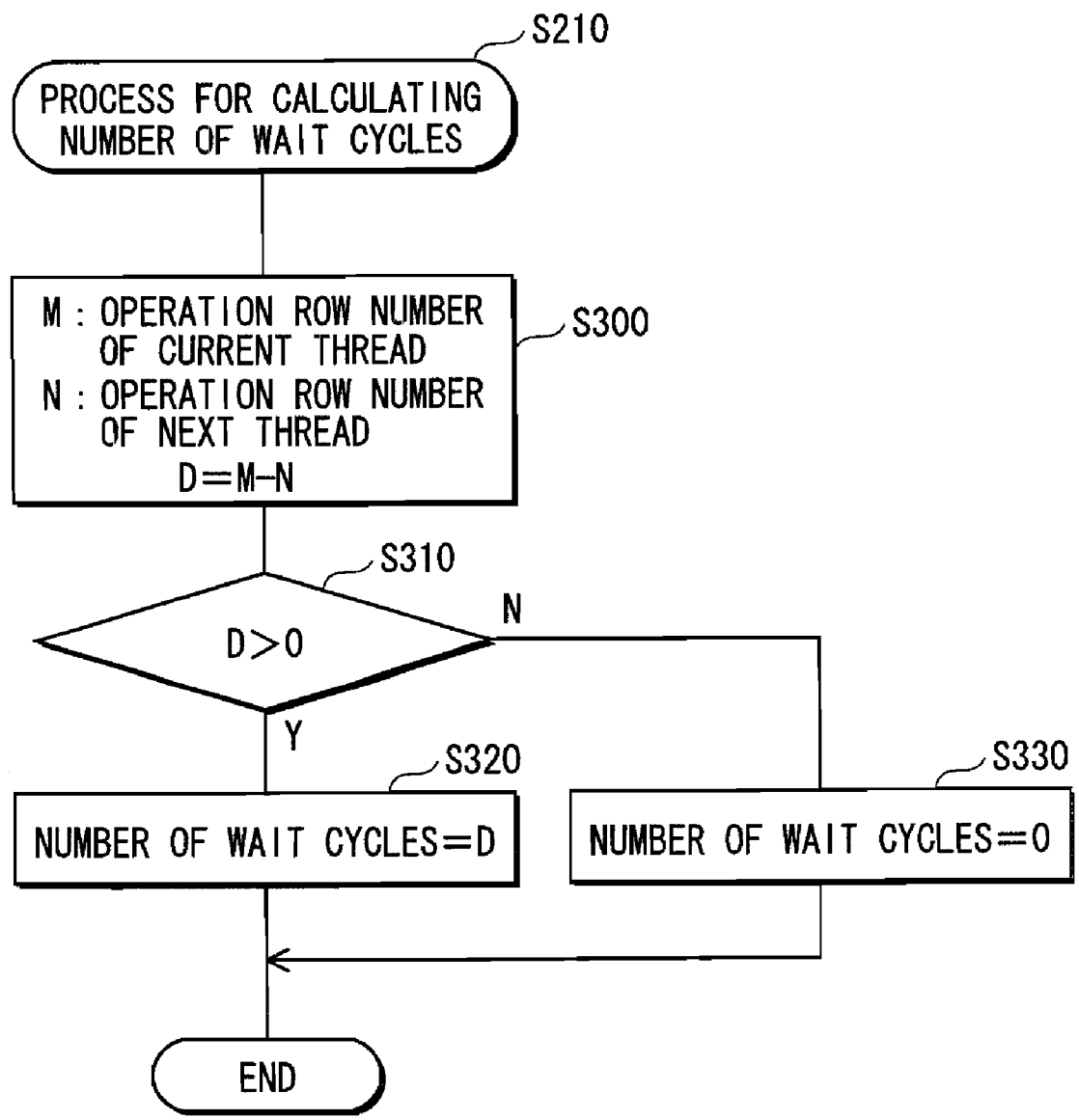
FIG. 15 is a flow chart showing a process of calculating the number of cycles to wait.
Figure 16:
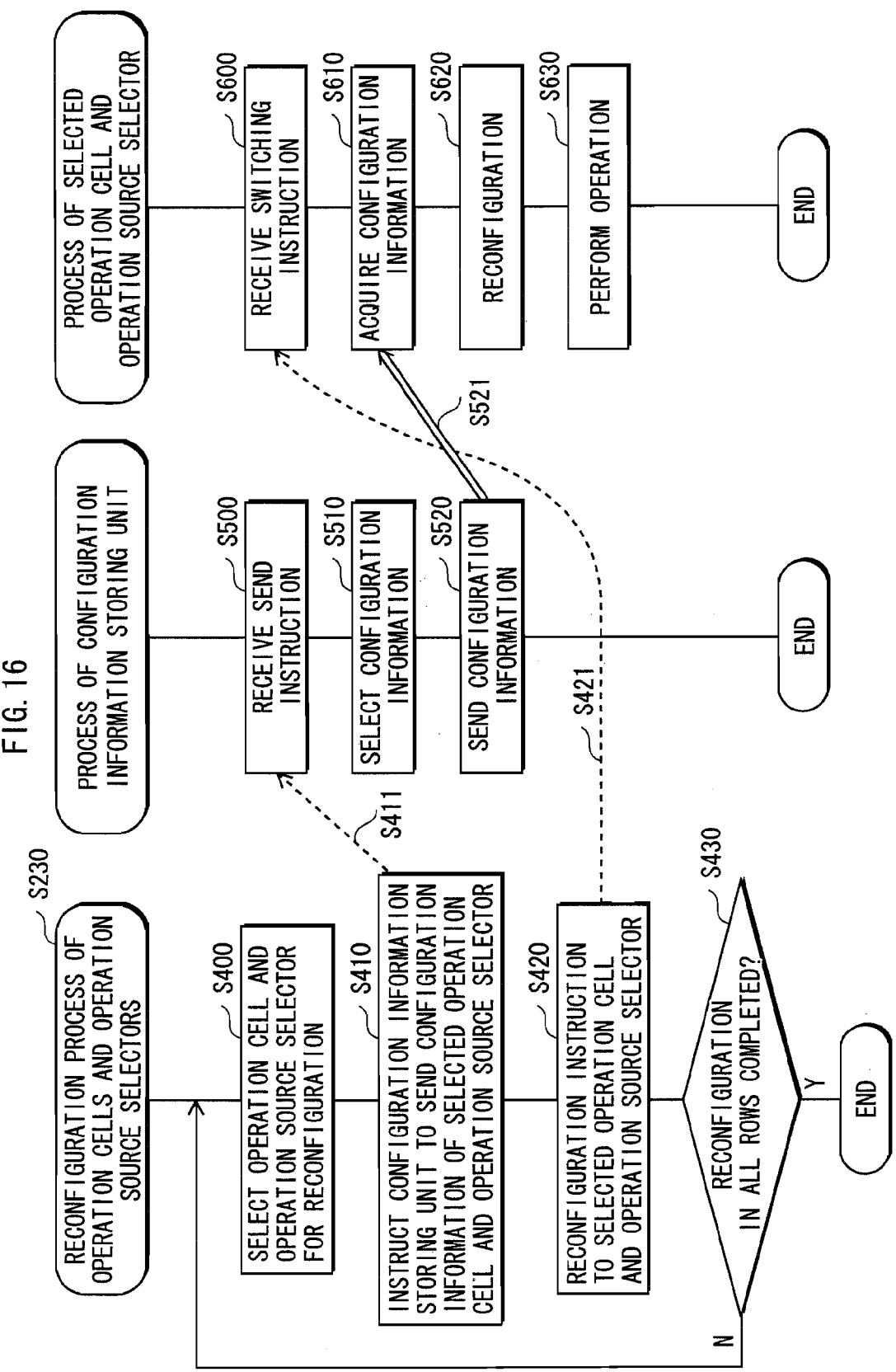
FIG. 16 is a flow chart showing a process of reconfiguring the operation cell and the operation source selector.

The following describes the operation of the processor of the present invention, with reference to the flowcharts of FIGS. 14-16. FIGS. 17-21 are also used for the description of the operation.

Here, the current thread and the next thread are assumed to be the thread A and thread B, respectively. In other words, the description is given by taking an example of a process of switching the thread A whose operation row number is "4" to the thread B whose operation row number is "8".

Figure 17:
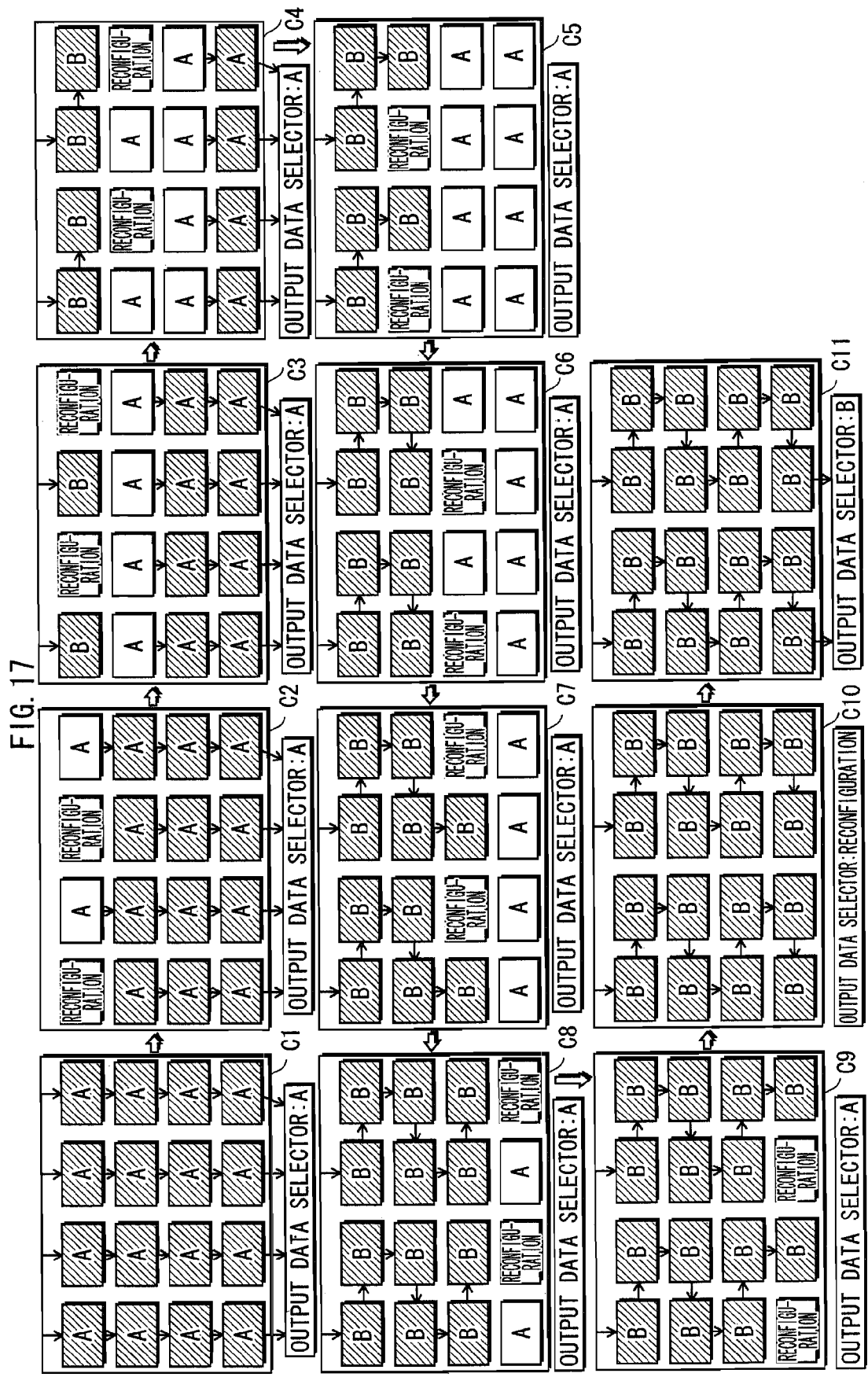
FIG. 17 is a transition diagram of the dynamic reconfigurable operation circuit when the thread A is switched to the thread B.

FIG. 17 is a transition diagram of the dynamic reconfigurable operation circuit when the thread A is switched to the thread B. FIG. 17 shows a transition of the dynamic reconfigurable operation circuit from Cycle 1 to Cycle 11 at the time of the thread switching. A dynamic reconfigurable operation circuit C1 is a circuit in the Cycle 1, and a dynamic reconfigurable operation circuit C2 is a circuit in the Cycle 2. "A" shown in each operation cell represents the configuration for the thread A, and in the same manner, "B" and "C" represent the configurations for the threads B and C, respectively. Also, the operation cells indicated by cross-hatching indicate that the cells are being executed, and "reconfiguration" indicates that the reconfiguration is being performed for the next thread.

Figure 18:
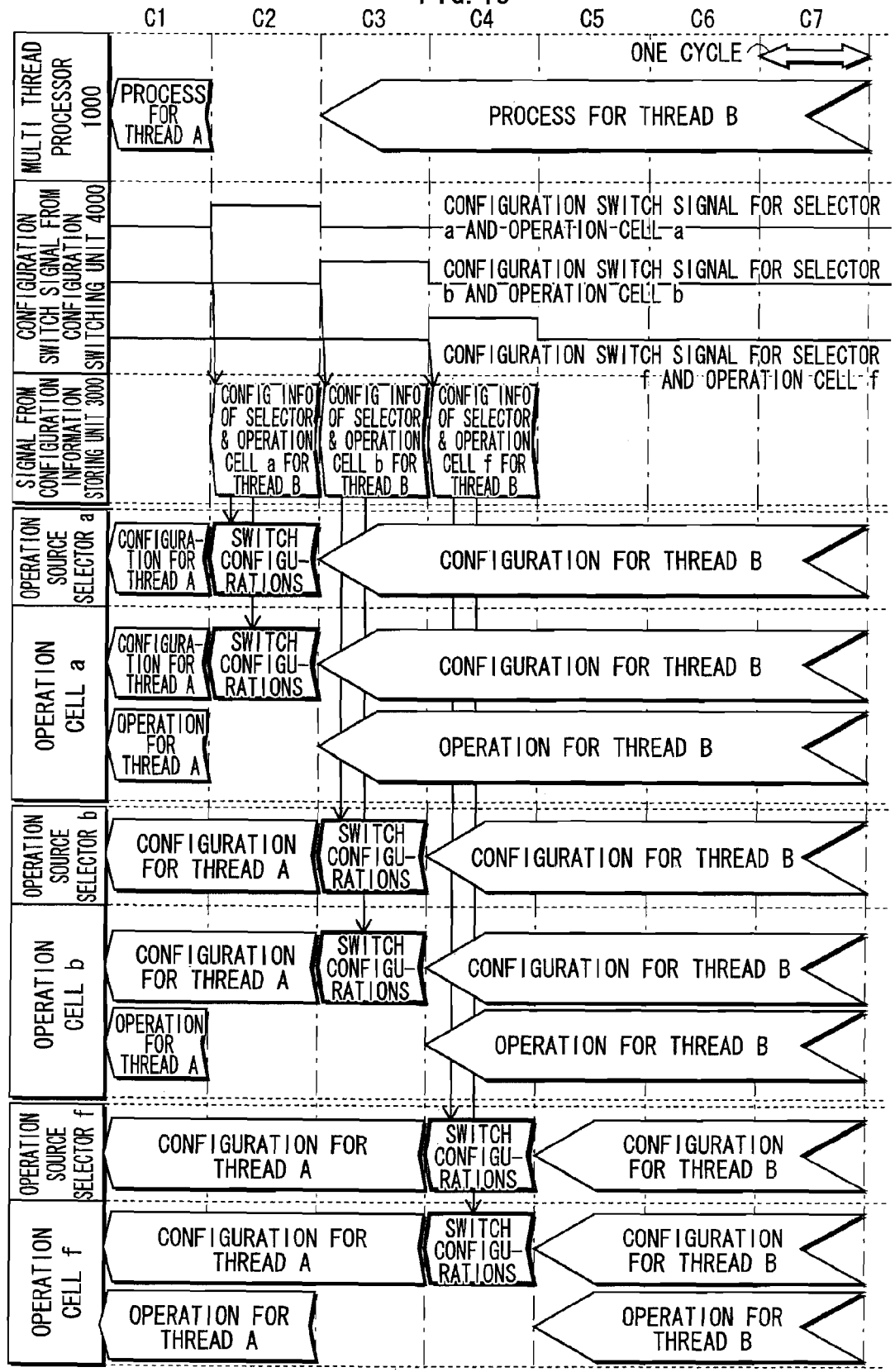
FIG. 18 is a time chart showing the relationship between (i) the control signals sent from the multi thread processor 1000 and such and (ii) the processes of the operation cells and such, when switching threads.

FIG. 18 is a time chart showing the relationship between (i) the control signals sent from the multi thread processor 1000 and such and (ii) the processes of the operation cells and such, in the thread switching. For the sake of convenience in the description, FIG. 18 shows only the processes of the operation cells a, b, and f among the 16 operation cells.

Figure 19:
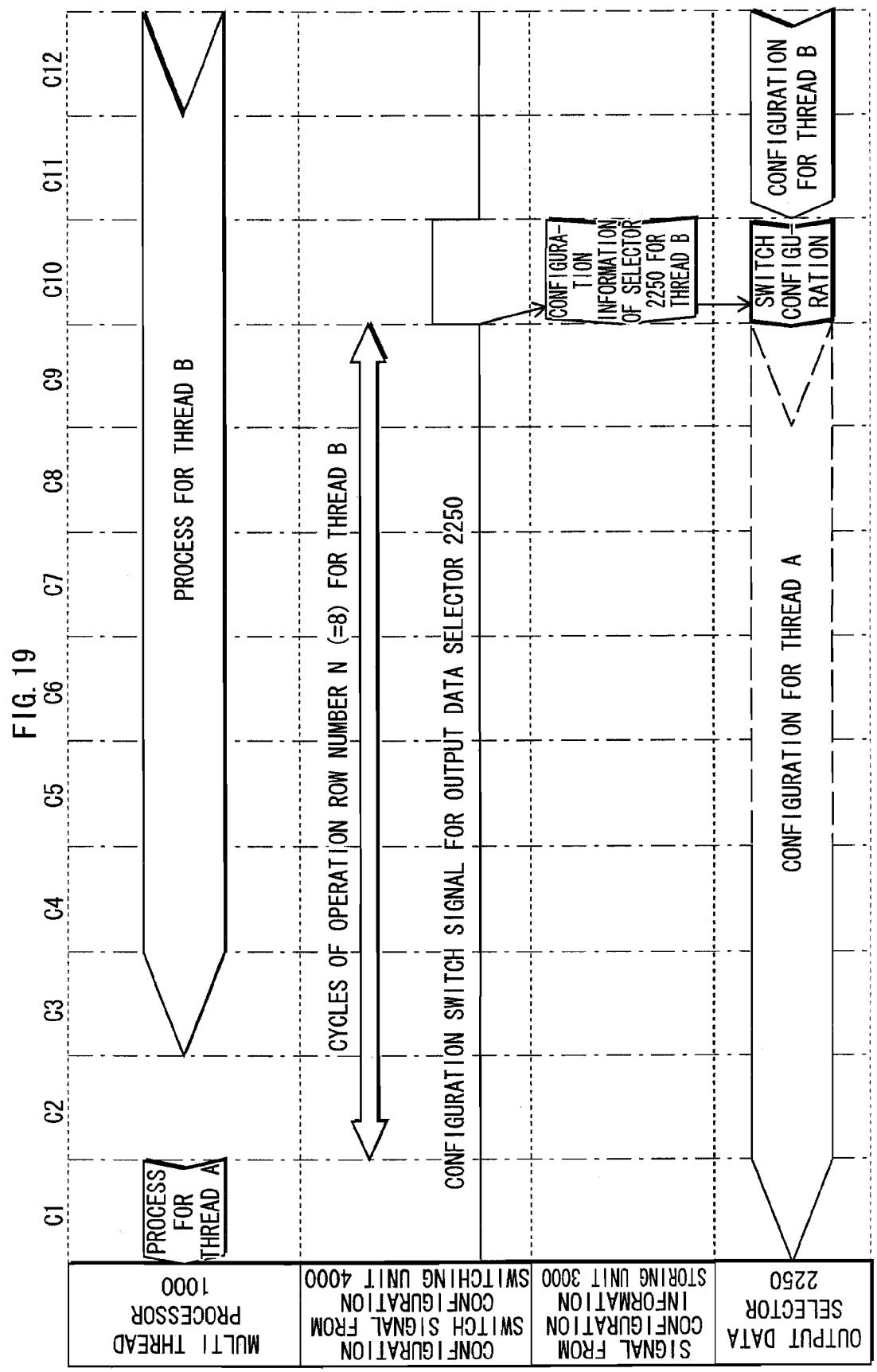
FIG. 19 is a time chart showing the relationship between the control signal and the process of the output data selector.
Figure 20:
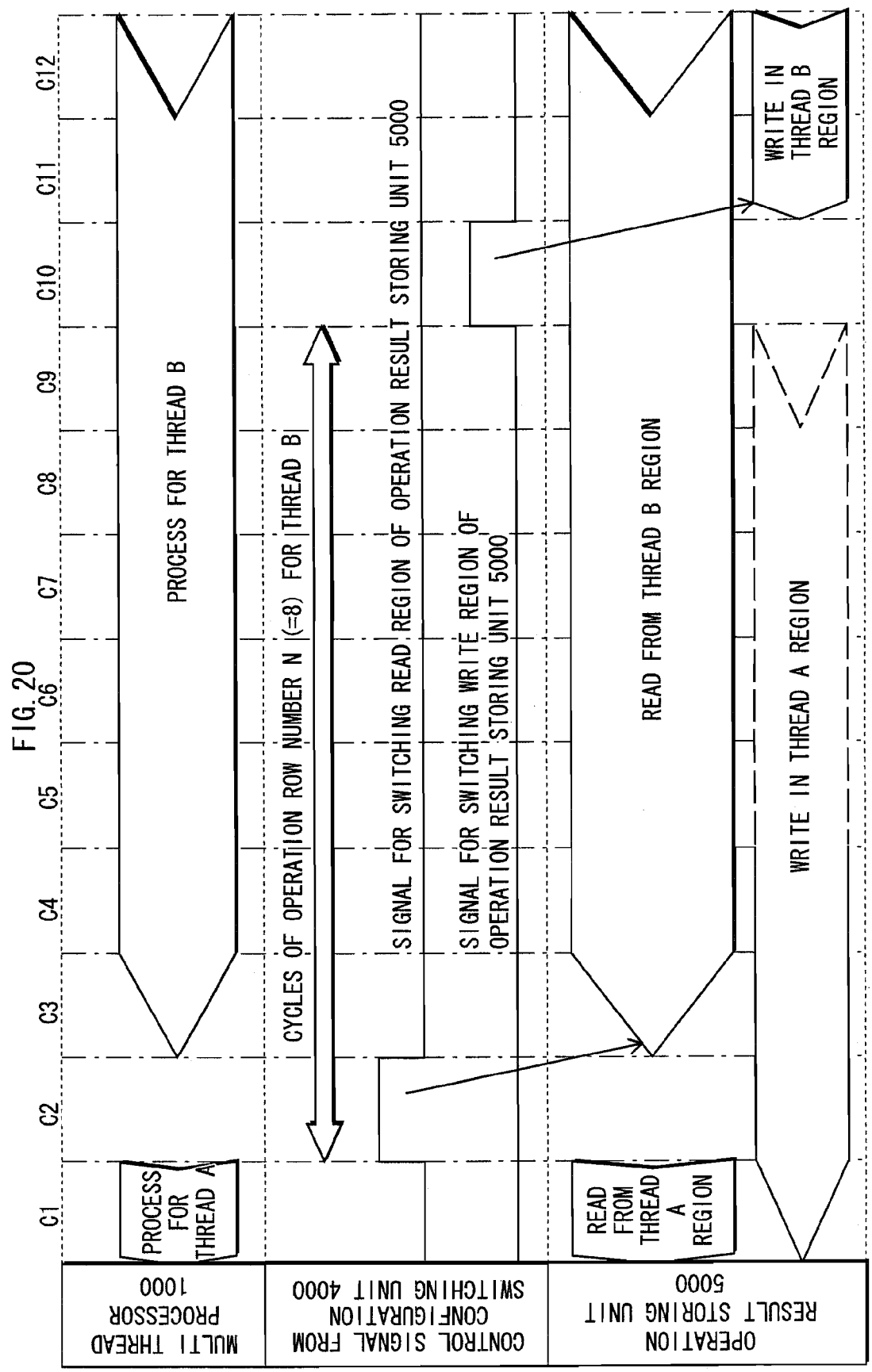
FIG. 20 is a time chart showing the relationship between the control signals and an operation result storing unit 5000.

FIG. 19 is a time chart showing the relationship between the control signals and the process of the output data selector 2250, and FIG. 20 is a time chart showing the relationship between the control signals and the operation result storing unit 5000.

Note that the cycles of the time charts shown in FIGS. 18-20 have the same timing as the cycle shown in FIG. 17. In other words, the Cycle C1 shown in FIG. 17 has the same timing as Cycle C1 shown in FIG. 18.

Figure 21:
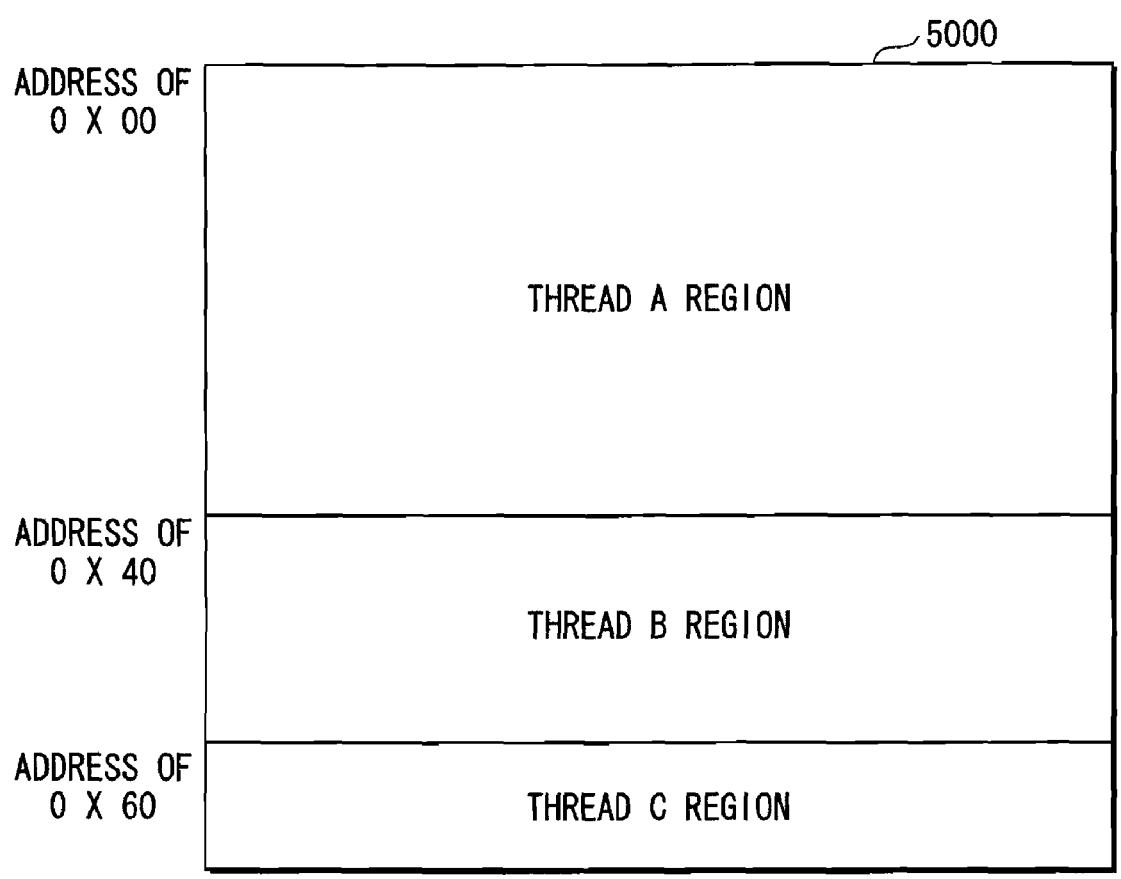
FIG. 21 shows the regions of the threads in the operation result storing unit 5000.

FIG. 21 shows the regions of the threads in the operation result storing unit 5000.

In the present embodiment, a region for the thread A is referred to as a region having addresses of 0x00-0x3F, a region for the thread B is referred to as a region having addresses of 0x40-0x5F, and a region for the thread C is referred to as a region having addresses of 0x60-0x6F.

The following describes a switching process, with reference to a flow chart shown in FIG. 14.

FIG. 14 is a flow chart showing the processes of the multi thread processor 1000 and the configuration switching unit 4000 at the time of the thread switching.

First, the multi thread processor 1000 executes the thread A that is the current thread, while operating the dynamic reconfigurable operation circuit C1 (see FIG. 17) (step S100).

Specifically, the multi thread processor 1000 supplies the operation data to the operation cells a, b, c, and d.

Upon receiving the operation data, the operation cells pass operation results to the lower operation cells in sequence, and store the operation results in the operation result storing unit 5000 in the end.

The multi thread processor 1000 executes the thread A by repeating the processing of reading the operation data that has been stored when the next loop begins, performing a predetermined process, and supplying, to the operation cells, the resultant operation data obtained by performing the process (see FIG. 6).

At the last loop among the loops in which the above-described processing is repeated, in other words, when the multi thread processor 1000 judges whether or not the loop is the last loop in the time given to the thread A (step S110), and further judges that the loop is the last loop and the process of the processor 100 is not to be terminated (step S110: Y, step S120: N), the multi thread processor 1000 starts switching threads.

When judging that the loop is not the last loop (step S110: N), the multi thread processor 1000 repeats the loop of the current thread. When judging that the process of the processor 100 is to be terminated (step S120: Y), the multi thread processor 1000 performs a termination process.

When judging that the thread switching is to be started, the multi thread processor 1000 selects the next thread (step S130), and instructs the configuration switching unit 4000 to switch threads (S140). When giving the instruction, the multi thread processor 1000 sends the configuration switching unit 4000 the IDs of the current thread and the next thread (step S141).

Then, the multi thread processor 1000 starts the process of the next thread (step S100). Note that the multi thread processor 1000 does not start the process of the next thread when receiving a stop signal of the process that is sent by the configuration switching unit 4000 (step S221).

Upon receipt of the switch instruction (step S200), the configuration switching unit 4000 calculates the number of cycles to wait (referred to as the number of wait cycles hereinafter) (step S210). When switching from the thread A to thread B, the number of wait cycles is "0 (zero)". The detailed description of the calculation process of the number of wait cycles is provided below, with reference to FIG. 15.

After calculating the number of wait cycles, the configuration switching unit 4000 waits for the number of wait cycles that have been calculated (step S220). While waiting, the configuration switching unit 4000 sends the stop signal to the multi thread processor 1000 (step S221).

Subsequently, the configuration switching unit 4000 switches a read region of the operation result storing unit 5000 to a read region for the next thread (step S230), and performs the reconfiguration of the operation cells and the operation source selectors (step S240).

The configuration switching unit 4000 does not reconfigure the operation cells and the operation source selectors all at once. Instead, the reconfiguration is performed in sequence, as shown in the dynamic reconfigurable operation circuits C2-C9 in FIG. 17. A description of the reconfiguration process of the operation cells and the operation source selectors is provided with reference to FIG. 16.

When completing the reconfiguration of all the operation cells 2100 and the operation source selectors 2210, the configuration switching unit 4000 reconfigures the output data selector 2250 (step S250, see FIG. 17: dynamic reconfigurable operation circuit C10). The timing of the reconfiguration process of the output data selector 2250 is described below with reference to FIG. 19.

When the reconfiguration of the output data selector 2250 is completed, all the components of the dynamic reconfigurable operation circuit have the configurations for the thread B (FIG. 17: dynamic reconfigurable operation circuit C11).

Then, the configuration switching unit 4000 switches a write region of the operation result storing unit 5000 to a write region for the next thread (step S260).

Meanwhile, the multi thread processor 1000 does not start the execution of the next thread while receiving the stop signal from the configuration switching unit 4000. When the stop signal is off, the multi thread processor 1000 waits for one cycle, and starts supplying the operation data of the next thread (step S100). This one cycle is for the reconfiguration of the first operation cell.

When switching the threads, the multi thread processor 1000 reads the operation data for the next thread from the operation result storing unit 5000, and also writes the operation result of the current thread in the operation result storing unit 5000. The timing of a region change process (steps S230 and S260) of the operation result storing unit 5000 is described below, with reference to FIG. 20.

<Calculation Process of Number of Wait Cycles>

FIG. 15 is a flowchart showing the calculation process of the number of wait cycles.

The number of wait cycles is for delaying the start of a switching process, so that the next thread is executed smoothly at the time of the thread switching.

The number of wait cycles is provided for a case where rewriting for the next thread cannot be performed. This may occur when the operation row number of the current thread is different from that of the next thread. In this case, even though an operation cell is rewritten for the next thread immediately after completing the operation of the current thread, if an operation cell that is to receive the operation result is performing the operation of the current thread, the operation cell for receiving the operation result cannot be rewritten for the next thread.

In such a case, the execution control of the next thread becomes complicated. Therefore, in the present embodiment, the start of the reconfiguration of the operation cells and such that are used for the thread switching process is delayed, thereby achieving a smooth execution of the next thread.

The configuration switching unit 4000 calculates the number of threads to wait (hereinafter referred to as "the number of wait threads"), with use of the operation row numbers of the current thread ID and the next thread ID that have been given upon receipt of the switch instruction from the multi thread processor 1000 (see FIG. 14: step S200).

The operation row number of threads is calculated by referring to the thread row number table 4200 (see FIG. 9(*b*)).

For example, when the thread ID 4210 of the current thread is "thread A", the operation row number 4220 is "4".

When the operation row number of the current thread is "M", and the operation row number of the next thread is "N", "N" is subtracted from "M" to obtain "D" (step S300), wherein "D" is compared to 0 (Step S310).

When in step S310 "D" is larger than 0 (zero), the number of wait cycles is set to be "D" (step S320). When in step S310 "D" is smaller than 0 (zero), the number of wait cycles is set to be 0 (zero) (step S330).

In other words, in a case of switching to a thread whose operation row number is the same or greater than the current thread, the number of wait cycles is 0 (zero), and in a case of switching to a thread whose operation row number is smaller than that of the current thread, the number of row difference is the number of wait cycle.

For example, in a case of switching from the thread A to the thread B, the operation row number changes from "4" to "8". Therefore, the number of wait cycle is 0 (zero). In a case of switching from the thread C to the thread A, the operation row number changes from "16" to "4". Therefore, the number of wait cycle is "12".

Consequently, in the case of switching from the thread A to the thread B, the reconfiguration of the operation cell starts without waiting for any cycles. As shown in FIG. 17, in the cycle immediately subsequent to the dynamic reconfigurable operation circuit C1, the reconfiguration is performed as seen in the dynamic reconfigurable operation circuit C2.

<Reconfiguration Process of Operation Cell and Operation Source Selector>

FIG. 16 is a flowchart showing the reconfiguration process of the operation cell and the operation source selector.

First, the configuration switching unit 4000 selects the operation cell 2100 and the operation source selector 2210 that are to be reconfigured (step S400). Here, the configuration switching unit 4000 selects an operation source selector that corresponds to the selected operation cell.

The configuration switching unit 4000 first selects the operation cell 2100 whose next thread's operation sequence number 4130 is "0 (zero)". The configuration switching unit 4000 refers to the operation cell row number table 4100 to calculate the operation sequence number (FIG. 9(*a*)).

For example, when the next thread is the thread B, the configuration switching unit 4000 first selects the operation cell a and the operation cell c.

Next, the configuration switching unit 4000 requests the configuration information storing unit 3000 to send the configuration information of the selected operation cell and the operation source selector (step S410). When requesting, the configuration switching unit 4000 notifies the configuration information storing unit 3000 the thread ID and the operation ID (step S411).

Upon receipt of the request (step S500), the configuration information storing unit 3000 obtains the configuration information name 3130 using the notified thread ID and the operation ID, selects the configuration information that can be specified by the configuration information name 3130 (step S510), and sends the selected configuration information (steps S520 and S521).

For example, when the operation cell a and the operation source selector a are selected, the configuration information of the operation cell a and the operation source selector a is sent (FIG. 18: a signal sent by the configuration information storing unit in the Cycle C2).

The configuration switching unit 4000 also gives an instruction for reconfiguration to the selected operation cell and the operation source selector (steps S420 and S421).

Upon receipt of the reconfiguration instruction (step S600), the operation cell and the operation source selector receive the configuration information (step S610), and perform reconfiguration (step S620).

For example, when the operation cell a and the operation source selector a are selected, the operation cell a and the operation source selector a acquire the configuration information through the signal line of the configuration information and perform reconfiguration (FIG. 18: a process of the operation cell a and the operation source selector a in the Cycle C2, and FIG. 17: dynamic reconfigurable operation circuit C2).

The operation cell and the operation source selector performs an operation (step S630) after the reconfiguration.

For example, the operation cell a and the operation source selector a that have been reconfigured start performing the operation of the thread B (FIG. 18: a process of the operation cell a and the operation source selector a in the Cycle C3). At this time, the multi thread processor 1000 provides, to the operation source selector, the operation data for the thread B.

After giving instructions to the configuration information storing unit 3000, the selected operation cell, and the selected operation source selector, the configuration switching unit 4000 performs reconfiguration of the next row (step S400) if the reconfiguration of the operation cells in all the operation rows has not been completed (step S430: N). The configuration switching unit 4000 ends the reconfiguration process if the reconfiguration of the operation cells in all the operation rows has been completed (step S430: Y).

For example, when the next thread is the thread B, the operation cell in the second row, namely the operation cell b and the operation cell d whose operation sequence numbers 4130 are respectively "1" in the operation cell row number table 4100 are selected to be reconfigured (FIG. 18: see the Cycle C3, and FIG. 17: dynamic reconfigurable operation circuit C3).

In a case where the next thread is the thread B, the operation row number 4220 of the thread B is "8". Therefore, the above-described reconfiguration process is sequentially performed on all the operation cells whose operation sequence numbers 4130 are one of "0" to "7" (FIG. 17: dynamic reconfigurable operation circuits C2-C9).

<Reconfiguration Process of Output Data Selector>

FIG. 19 is a time chart showing the relationship between the control signal and the process of the output data selector 2250.

The output data selector 2250 is reconfigured for the next thread after all the operation cells are reconfigured for the next thread (FIG. 19: the Cycle C10, and FIG. 14: step S240).

The steps of the reconfiguration are the same as the steps of the reconfiguration of the operation cells shown in FIG. 16.

When judging that all the operation cells are reconfigured for the next thread (FIG. 16: step S430: Y), the configuration switching unit 4000 requests the configuration information storing unit 3000 to send the configuration information of the output data selector 2250 for the next thread, and also gives an instruction for reconfiguration to the output data selector 2250.

Upon receipt of the request of sending the configuration information of the output data selector 2250 for the next thread, the configuration information storing unit 3000 refers to the operation cell configuration information data 3100, and sends the corresponding configuration information. Upon receipt of the reconfiguration instruction, the output data selector 2250 inputs the configuration information and performs reconfiguration.

For example, in a case where the next thread is the thread B, when the process of the operation row number "8" in the thread B is completed, the configuration information storing unit 3000 sends the configuration information, and the output data selector 2250 inputs the configuration information and performs reconfiguration (FIG. 19: the Cycle C10, and FIG. 17: the dynamic reconfigurable operation circuit C10).

Note that, in FIG. 19, the period shown by a dotted line (the cycles C5 to C9) in the "configuration for the thread A" of the output data selector 2250 indicates a period where the output data selector 2250 does not perform the reconfiguration process. This is because the execution of the thread A has been completed, and the output data selector 2250 does not receive the operation result data.

<Region Change Process of Operation Result Storing Unit>

FIG. 20 is a time chart showing the relationship between the control signals and the operation result storing unit 5000.

The operation result storing unit 5000 secures a region for each of the threads, as shown in FIG. 21, and stores the output of the output data selector 2250, which is read by the multi thread processor 1000.

Normally, the reading and writing is performed on the region of the same thread. However, when switching threads, the thread of the operation data to be stored may be different from that of the operation data to be read. In that case, regions to be accessed may be different.

For example, in a case where the current thread is the thread A, and the next thread is the thread B, it is necessary to write the operation data in the region for the thread A, and read the operation data from the region for the thread B.

The configuration switching unit 4000 instructs the operation result storing unit 5000 to switch the read region to a read region for the next thread when reconfiguring the operation cell in the first row of the next thread (FIG. 20: the Cycle C2). This is because the instruction of switching read regions is read by the multi thread processor 1000 at a cycle subsequent to the cycle of the reconfiguration of the operation cell in the first row.

Also, the configuration switching unit 4000 instructs the operation result storing unit 5000 to switch the write region to a write region for the next thread when all the operation cells have been reconfigured for the next thread (FIG. 20: the Cycle C10). This is because the operation data is written at a cycle subsequent to the cycle in which the reconfiguration of the last operation cell is performed.

Note that, in FIG. 20, the period shown by a dotted line (the cycles C5 to C9) in the "writing for the thread A" of the operation result storing unit 5000 indicates a period where the writing for the thread A is not performed.

<When Switching to Thread Having Operation Row Number Smaller than that of Current Thread>

Figure 22:
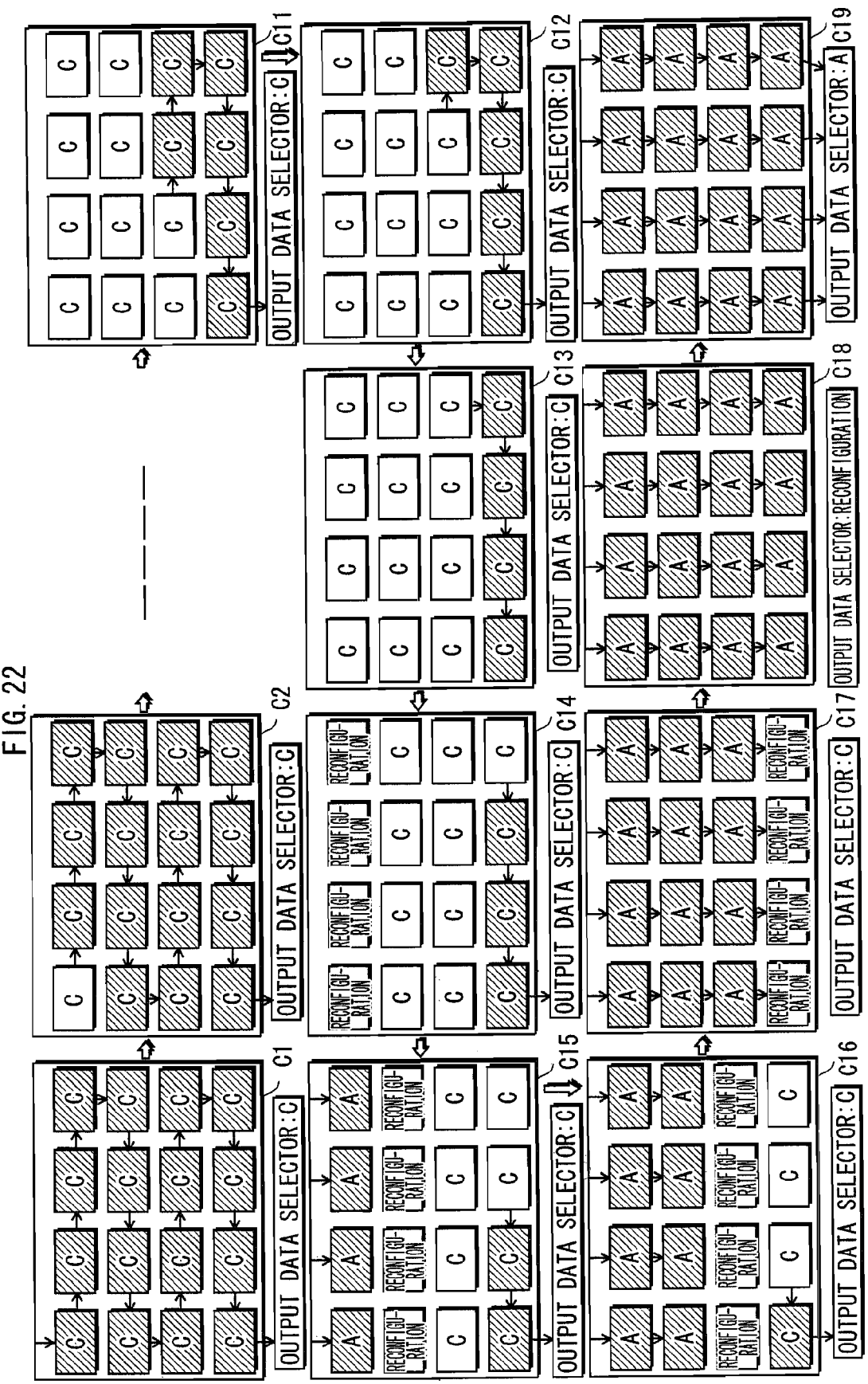
FIG. 22 is a transition diagram showing the dynamic reconfigurable operation circuit when the thread C is switched to the thread A.
Figure 23:
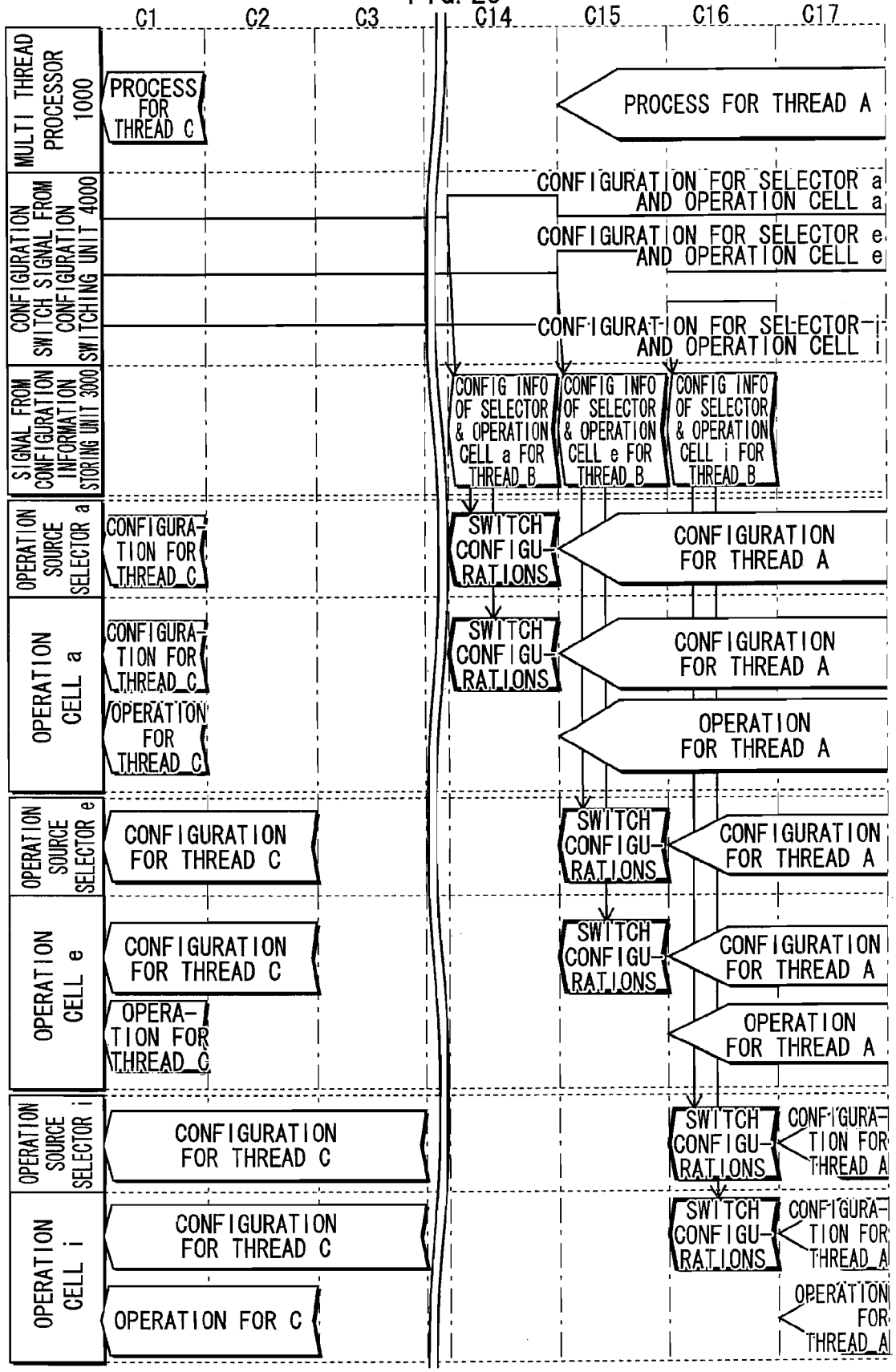
FIG. 23 is a time chart showing the relationship between (i) the control signals sent from the multi thread processor 1000 and such and (ii) the processes of the operation cells and such, when switching threads.

The following describes a case of switching the current thread to a thread whose operation row number is smaller than that of the current thread, with reference to FIGS. 22 and 23.

Here, a description is given of a case where the thread C whose operation row number is "16" is switched to the thread A whose operation row number is "4".

FIG. 22 is a transition diagram showing the dynamic reconfigurable operation circuit when the thread C is switched to the thread A. FIG. 22 shows the transition of the dynamic reconfigurable operation circuit from the cycle 1 to the cycle 19, when switching threads. The dynamic reconfigurable operation circuit C1 shows a circuit in the Cycle 1, and the dynamic reconfigurable operation circuit C2 shows a circuit in the Cycle 2.

FIG. 23 is a time chart showing the relationship between (i) the control signals sent from the multi thread processor 1000 and such and (ii) the processes of the operation cells and such, in the thread switching. For the convenience of the description, FIG. 23 only shows the processes of the operation cells a, e, and i among 16 operation cells 2100.

The flow of the switching process is the same as the flow charts of FIGS. 14 to 16. Here, a description is given of a difference from a case of switching the current thread to a thread whose operation row number is larger than that of the current thread.

The difference is a timing of starting the reconfiguration of the operation cells and such.

In other words, as described above, when switching to a thread whose operation row number is larger than the current thread, the configuration switching unit 4000 starts the reconfiguration process of the operation cells immediately after receiving an instruction for switching threads from the multi thread processor 1000. This is because the number of wait cycles is 0 (zero).

On the other hand, when switching to a thread whose operation row number is smaller than the current thread, the configuration switching unit 4000 needs to wait for the number of wait cycles that is necessary before starting the reconfiguration process of the operation cells. This is because, even though an operation cell is rewritten for the next thread immediately after completing the operation of the current thread, if an operation cell that is to receive the operation result is performing the operation of the current thread, the operation cell for receiving the operation result cannot be rewritten for the next thread.

The number of cycles (D) obtained by subtracting the operation row number of the thread A that is the next thread (N=4) from the operation row number of the thread C that is the current thread (M=16) is 16−4=12 (FIG. 14: step S210, and FIG. 15: step S300), which is larger than 0 (zero) (step S310: Y). Therefore, the number of wait cycles is 12 (step S320).

The configuration switching unit 4000 waits for the 12 cycles (FIG. 14: step S220, and FIG. 23: the Cycles C2 to C13), and then starts the reconfiguration of the operation cells and such (FIG. 14: step S240, and FIG. 23: the Cycle C14). The reconfiguration is performed by the dynamic reconfigurable operation circuits C14 to C17 shown in FIG. 22.

While the configuration switching unit 4000 is waiting, namely during the Cycles C2 to C13 of the dynamic reconfigurable operation circuits C2 to C13, only the process of the thread C is being performed.

After the process of the thread C is completed, the configuration switching unit 4000 performs reconfiguration from the operation cell in the first row of the thread A in the Cycle 14, as shown by the dynamic reconfigurable operation circuit C14 in FIG. 22.

Meanwhile, the multi thread processor 1000 is, during the Cycles C2 to C14, in a state of waiting for starting the execution of the thread A that is the next thread (FIG. 23: the Cycles C2 to C14).

Figure 24:
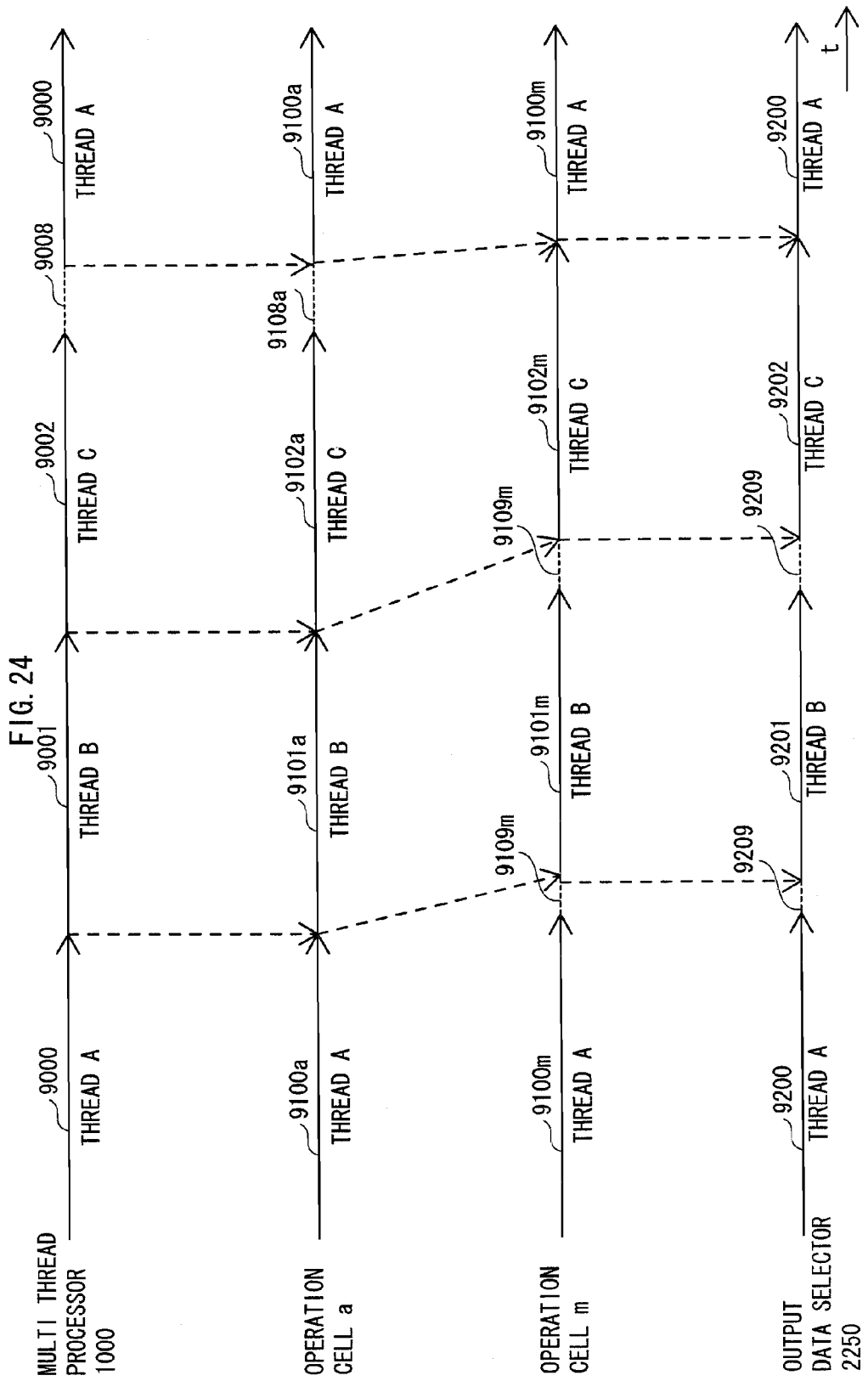
FIG. 24 is a time chart showing a thread switching schedule.

FIG. 24 is a time chart that summarizes the schedule of the process of switching threads.

FIG. 24 shows a case where the threads are switched in order of the thread A, thread B, and thread C.

A period 9000 of the multi thread processor 1000 indicates a period during which the multi thread processor 1000 performs the process of the thread A. In the same manner, a period 9001 and a period 9002 indicate a period for the process of the thread B and a period for the process of the thread C, respectively. A period 9008 indicates a bubble period for waiting for the completion of the operation process in the dynamic reconfigurable operation circuit 2000. In other words, the period 9008 starts when the multi thread processor 1000 finishes supplying the operation data of the current thread, and ends when the multi thread processor 1000 starts supplying the operation data of the next thread (FIG. 22: dynamic reconfigurable operation circuit C2-C14).

A period 9100*a* indicates a period for the process of the thread A in the operation cell a. A period 9101*a* indicates a period for the process of the thread B in the operation cell a, and a period 9102*a* indicates a period for the process of the thread C of the operation cell a. A period 9108*a* indicates a bubble period for waiting for the completion of the operation process in the dynamic reconfigurable operation circuit 2000 (FIG. 22: dynamic reconfigurable operation circuit C2-C14).

A period 9100*m* indicates a period for the process of the thread A in the operation cell m. A period 9101*m* indicates a period for the process of the thread B in the operation cell m, and a period 9102*m* indicates a period for the process of the thread C of the operation cell m. A period 9109*m* indicates a bubble period for waiting for the switching of the configuration of the operation cell 2100 in a preceding row. The period 9109*m* for switching from the thread A to thread B is the period of the dynamic reconfigurable operation circuits C5-C9, which are shown in FIG. 17.

A period 9200 indicates a period for the process of the thread A in the output data selector 2250. A period 9201 indicates a period for the process of the thread B in the output data selector 2250, and a period 9202 indicates a period for the process of the thread C of the output data selector 2250. A period 9209 indicates a bubble period for waiting for the switching of the configuration of the operation cell 2100. The period 9209 for switching from the thread A to thread B is the period of the dynamic reconfigurable operation circuits C5-C10, which are shown in FIG. 17 (FIG. 19: the Cycles C5-C10).

<Examples of Program>

The following describes the examples of instructions and programs that are executed by the processor of the present embodiment.

FIG. 25 shows the examples of instructions and such that are related to the operation result storing unit 5000.

FIG. 25A shows an example of an instruction for setting a region that is to be occupied by the thread in the operation result storing unit 5000, FIG. 25B shows an example of set programs of the thread regions, and FIG. 25C shows set values at the time of execution of the threads.

A "DMset" instruction shown in FIG. 25A specifies that a thread having the thread number of "The_num" uses a region having addresses of "St_Adr" to "Ed_Adr".

A program shown in FIG. 25B specifies that the thread A uses a region having addresses of "0x00" to "0x3F", the thread B uses a region having addresses of "0x40" to "0x5F", and the thread C uses a region having addresses of "0x60" to "0x6F" (see FIG. 21).

FIG. 25C is an example of contents stored in the operation result storing unit 5000 when the processor 100 starts the processing of the thread A and such.

As shown in FIG. 25C, the operation result storing unit 5000 has stored therein, for each thread, a read address (DMRA) and write address of FIFO. A read address read by the multi thread processor 1000 is a DMRA of the thread that is being executed, and a write address written by the dynamic reconfigurable operation circuit 2000 is a DMWA of the thread that is being executed. Each of the initial values of the DMRA and DMWA is set as the initial address of a region of each thread at the time of execution of the program of FIG. 5B.

For example, given that the DMRA and DMWA of the thread A are respectively DMRA_A and DMWA_A, the DMRA and DMWA of the thread B are respectively DMRA_B and DMWA_B, and the DMRA and DMWA of the threadC are respectively DMRA_C and DMWA_C, the initial addresses of the respective thread regions are set as shown in FIG. 25C, by the execution of the program shown in FIG. 25B.

After the above-described setting, the multi thread processor 1000 and the dynamic reconfigurable operation circuit 2000 perform the processes of the threads. After the dynamic reconfigurable operation circuit 2000 writes the operation result in the operation result storing unit 5000, the DMWAs of the threads are incremented.

For example, in a case where a unit of the DMWA is a word, and the data that is written is one word, only the DMWA of the thread that is being executed is incremented, such as "DMWA=DMWA+0x01".

Note that, in a case where the number of pieces of the operation data is W, W is added to the DMWA.

Also, after the multi thread processor 1000 reads the operation result data from the operation result storing unit 5000, the DMRA is incremented.

As seen in "DMRA=DMRA+0x01", only the DMRA of the thread that is being executed is incremented.

Note that, in a case where the number of pieces of the operation data is W, W is added to the DMRA.

In a case where the DMWAs and DMRAs exceed the end addresses Ed_Adr of the respective thread regions, which are set by the program in FIG. 25B, St_Adr is set.

With the above-described structure, the region of each thread is managed in FIFO.

Figures 26A, 26B:
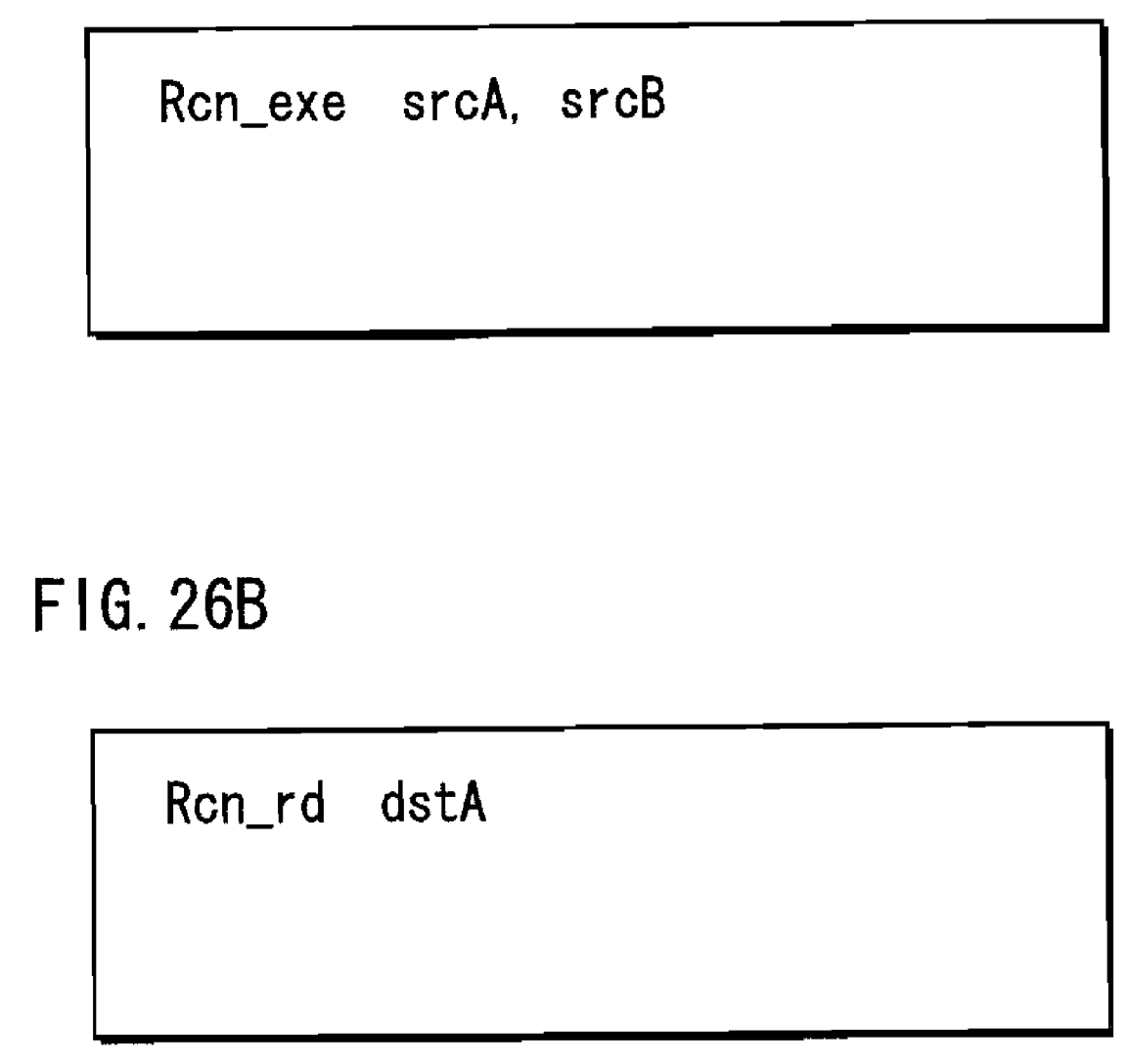

FIG. 26A shows an example of an operation instruction given from the multi thread processor 1000 to the dynamic reconfigurable operation circuit 2000, and FIG. 26B shows an example of an instruction for the operation result storing unit 5000 to read the operation result.

An instruction "Rcn_exe" as shown in FIG. 26A is an operation instruction given to the dynamic reconfigurable operation circuit 2000, and "srcA" and "srcB" specify the register numbers in the multi thread processor 1000.

The above-described instruction causes the execution of the thread for one loop.

An instruction "Rcn_rd" shown in FIG. 26B is an instruction for reading the operation result of the dynamic reconfigurable operation circuit 2000, and "dstA" is a register number in the multi thread processor 1000. The operation result data is stored in a register corresponding to the register number.

The following is a brief description of the operation. Upon receipt of the "Rcn_exe" instruction, the dynamic reconfigurable operation circuit 2000 starts performing an operation with the configuration for the thread that is being executed. As the data of the operation, the dynamic reconfigurable operation circuit 2000 uses data having the register number specified by the "Rcn_exe" instruction. The data of the operation result of the dynamic reconfigurable operation circuit 2000 is stored in a region of the operation result storing unit 5000 having an address specified by the DMWA of the corresponding thread.

The "Rcn_rd" instruction is an instruction for reading, for the multi thread processor 1000, the operation data stored in the operation result storing unit 5000. The operation data located at the address indicated by the DMRA of the corresponding thread is transferred to a register specified by the "Rcn_rd" instruction.

Note here that, in a case where the data of the corresponding thread is not stored in the operation result storing unit 5000, the operation result storing unit 5000 sends an operation stop signal to the multi thread processor 1000. The judgment of no operation data may be realized by detecting that the DMRA of the corresponding thread and the DMWA thereof are the same.

The data of the corresponding thread is not stored in the operation result storing unit 5000 if the multi thread processor 1000 has read the operation result without supplying the operation data to the dynamic reconfigurable operation circuit 2000. In this case, the multi thread processor 1000 performs an operation corresponding to the process of the thread, such as an operation for stopping the process of reading the operation data from the operation result storing unit and supplying different operation data to the dynamic reconfigurable operation circuit.

After the dynamic reconfigurable operation circuit 2000 stores the operation result data in the operation result storing unit 5000, the operation stop signal is removed. Subsequently, the multi thread processor 1000 reads the operation result data stored in the operation result storing unit 5000.

With the above-described structure, the operation result data can be managed in FIFO for each thread and stored in a predetermined region of each thread in the operation result storing unit 5000, without being affected by the switching of the configuration of the dynamic reconfigurable operation circuit 2000.

In this way, the multi thread processor 1000 does not need to determine the order in which each piece of the operation result data is stored when the threads are switched in the dynamic reconfigurable operation circuit 2000, which makes it easy to manage the operation result data of a desired thread.

Specifically, the "Rcn_rd" instruction for acquiring the operation result of the "Rcn_exe" instruction can be issued after the number of cycles equal to the operation row number of the dynamic reconfigurable operation circuit 2000+one cycle elapse. This is because the operation in the dynamic reconfigurable operation circuit 2000 requires the number of cycles that is equal to the number of the operation row number, and the writing in the operation result storing unit 5000 requires one cycle.

The following specifically describes the issue of the "Rcn_exe" instruction and "Rcn_rd" instruction, with reference to FIGS. 27A and 27B that show examples of programs.

FIG. 27A shows a program only having the Rcn_exe instruction and Rcn_rd instruction. It is assumed here that the operation result storing unit 5000 does not store the operation result data for the thread A before the execution of the program.

For example, the process of the thread A is performed by repeatedly executing the "Rcn_exe" instruction and "Rcn_rd" instruction while changing arguments.

When the "Rcn_exe" instruction shown in FIG. 27A is issued, the data stored in registers R1 and R2 of the multi thread processor 1000 is transferred to the dynamic reconfigurable operation circuit 2000, whereby the operation in the dynamic reconfigurable operation circuit 2000 starts.

In the next cycle, the multi thread processor 1000 issues the "Rcn_rd" instruction. In this cycle, no operation result data is stored in the operation result storing unit 5000 (DMWA_A and DMRA_A have the same value). Therefore, the multi thread processor 1000 receives the operation stop signal from the operation result storing unit 5000, and stops the process.

The operation in the dynamic reconfigurable operation circuit 2000 ends four cycles after the issue of the "Rcn_exe" instruction (three cycles after the issue of the "Rcn_rd" instruction).

In the following cycle, the operation result data is stored in the operation result storing unit 5000, the value of the DMWA_A increases to be different from the value of the DMRA_A, and the operation stop signal from the operation result storing unit 5000 to the multi thread processor 1000 is removed. Subsequently, the execution of the "Rcn_rd" instruction is resumed, and the process of reading the operation result data from the operation result storing unit 5000 is performed.

The above-described program makes it possible to instruct the dynamic reconfigurable operation circuit 2000 to perform an operation and to read the operation result, with use of the "Rcn_exe" instruction and the "Rcn_rd" instruction.

In the program shown in FIG. 27A, the multi thread processor 1000 stops performing the operation for four cycles. Here, a description is provided of the program that does not cause the operation to stop, with use of FIG. 27B.

The program of FIG. 27B has an instruction for an operation for four cycles inserted therein, between the "Rcn_exe" instruction and the "Rcn_rd" instruction of FIG. 27A. An "Add" instruction is for performing an addition while using the register in the multi thread processor 1000 as an operation source, and writing the operation result data in the register in the multi thread processor 1000. An operation resource is only used in the multi thread processor 1000, and not in the dynamic reconfigurable operation circuit 2000. One cycle is necessary for the operation of the "Add" instruction.

The above-described "Add" instruction is for four cycles, and five cycles elapse from the issue of the "Rcn_rd" instruction to the issue of the "Rcn_exe" instruction. Therefore, the operation in the dynamic reconfigurable operation circuit 2000 is completed, and the value of the DMWA_A is different from that of the DMRA_A. Consequently, the multi thread processor 1000 does not stop performing the operation.

The above-described structure can prevent the performance of the dynamic reconfigurable operation circuit 2000 from being deteriorated when switching the configuration thereof. Furthermore, instead of saving the intermediate operation data that requires reading and writing all at once, the dynamic reconfigurable operation circuit 2000 sequentially stores the operation result data that needs to be read and written. Therefore, the storing unit can be realized by a memory having a small number of input/output ports, resulting in the area of the circuit being smaller.

Furthermore, the operation result data stored in the above-described storing unit is managed in FIFO for each thread. Therefore, the programs executed in the multi thread processor 1000 are not affected by the order of the operations when switching the configurations, and can be managed for each thread. Therefore, a program for reading can be easily made.

Second Embodiment

In the first embodiment, the wait cycle of the multi thread processor 1000 occurs when switching to a thread whose operation row number is smaller than that of the current thread (see FIG. 24: the period 9008).

In the first embodiment, the configuration switching unit 4000 stops the multi thread processor 1000 in consideration of the wait cycle, so that the threads are switched smoothly. In the present embodiment, this wait cycle is taken into consideration by the program, and not by the configuration switching unit 4000.

Therefore, the multi thread processor 1000 does not need any period for the wait cycle (hereinafter referred to as "wait cycle period") in the present embodiment.

Figure 28:
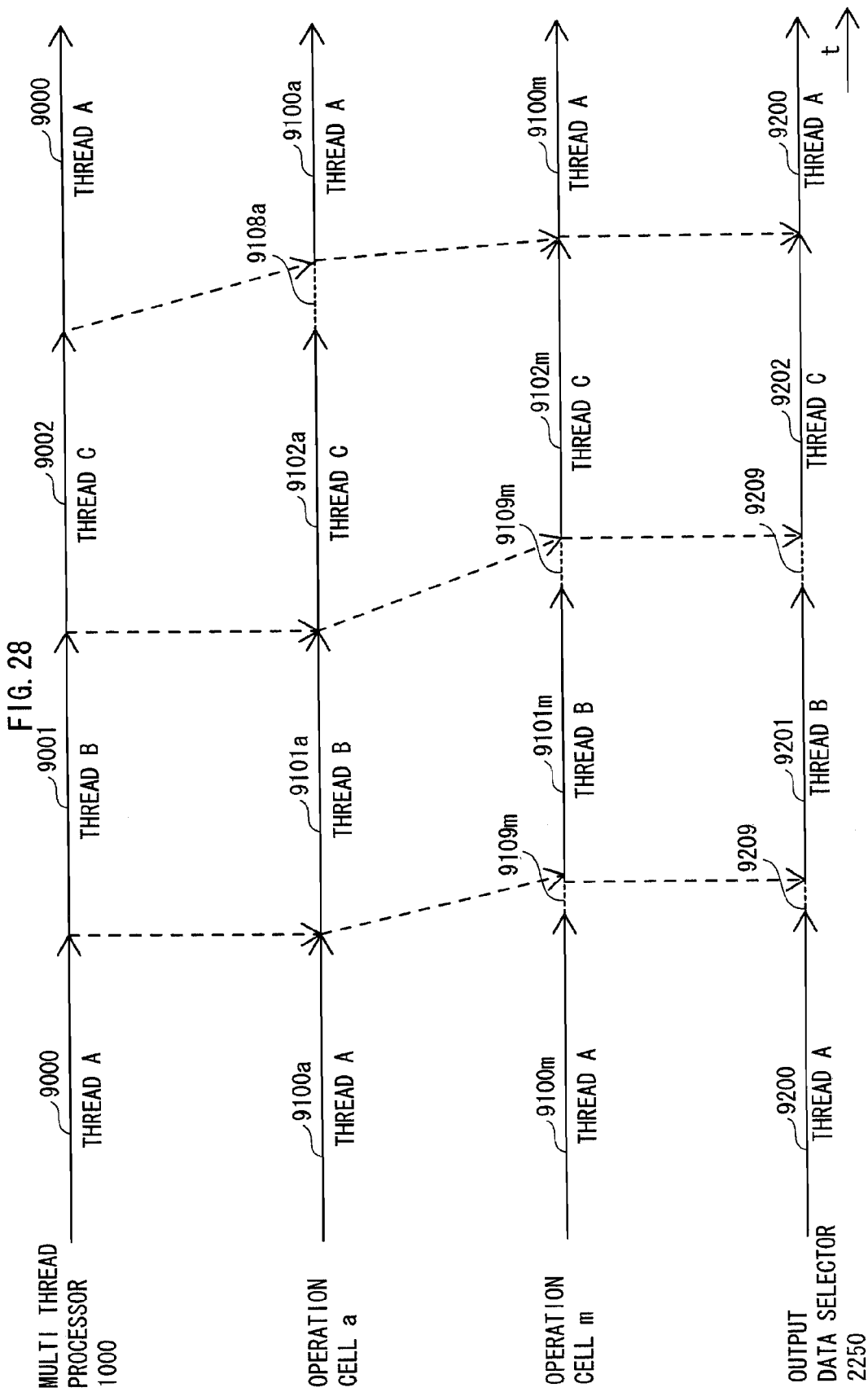
FIG. 28 is a time chart showing a thread switching schedule without a wait cycle period.

FIG. 28 is a time chart showing a thread switching schedule that does not include the wait cycle period. FIG. 28 is the same as FIG. 24 except that FIG. 28 does not include the period 9008. This means that the present embodiment is the same as the first embodiment except that in the first embodiment the wait cycle is calculated and the stop signal is issued to the multi thread processor 1000.

In the present embodiment, the threads are executed by the program taking the wait cycle period into consideration, since this wait cycle period is eliminated.

<General Outline>

FIG. 29 shows an example of a description of the Rcn_exe instruction in the instruction specification.

FIG. 29 shows the operation instruction given to the dynamic reconfigurable operation circuit 2000, and the data read instruction given to the operation result storing unit 5000, and examples of explanations for the instructions.

In the first embodiment, the multi thread processor 1000 has the period 9008 during which the operation is stopped, when the thread of the thread C is switched to the process of the thread A (see FIG. 24). This is to stop issuing the new operation instruction to the dynamic reconfigurable operation circuit 2000 while the configurations are being switched, in a case where the dynamic reconfigurable operation circuit 2000 switches the current configuration to the configuration having a larger operation row number. This control is performed by the configuration switching unit 4000 in the process of step S210 in FIG. 14 and such.

The second embodiment eliminates the need of the configuration switching unit 4000 controlling the multi thread processor 1000 for stopping the operation that is described in the step S210 of FIG. 14 and such (note here that in the steps S210 and S220 the processes for waiting for cycles D remain). Other than the above-described control, the control flow of the configuration switching unit 4000 is the same as the control flow of the first embodiment.

When the operation stop control performed on the multi thread processor 1000 is eliminated, the period 9008 for stopping the operations does not occur. This increases a period for issuing instructions. FIG. 28 shows an operation schedule in which the period 9008 for stopping the operations does not occur.

Note here that the Rec_exe instruction is not guaranteed during the period 9008. The prohibition against the issue of the Rec_exe instruction during the period 9008 (D cycles) must be guaranteed by a programmer.

Therefore, it is preferable that the instruction specification or such includes a description indicating that the Rcn_exe instruction is not to be issued during the D cycle.

Third Embodiment

In the first embodiment, the operation data output by the dynamic reconfigurable operation circuit 2000 is stored in the operation result storing unit 5000 before being read by the multi thread processor 1000. In the present embodiment, the operation data is directly passed to the multi thread processor 1000 without being stored in the operation result storing unit 5000, unless the operation data is the minimum amount of data necessary to be stored in the operation data storing unit 5000, namely operation result data at the end of time allocated to the thread.

<General Outline>

The third embodiment is different from the first embodiment because of the process of output from the operation result storing unit 5000 to the multi thread processor 1000, and the configuration including an operation result selector 6000.

Figure 30:
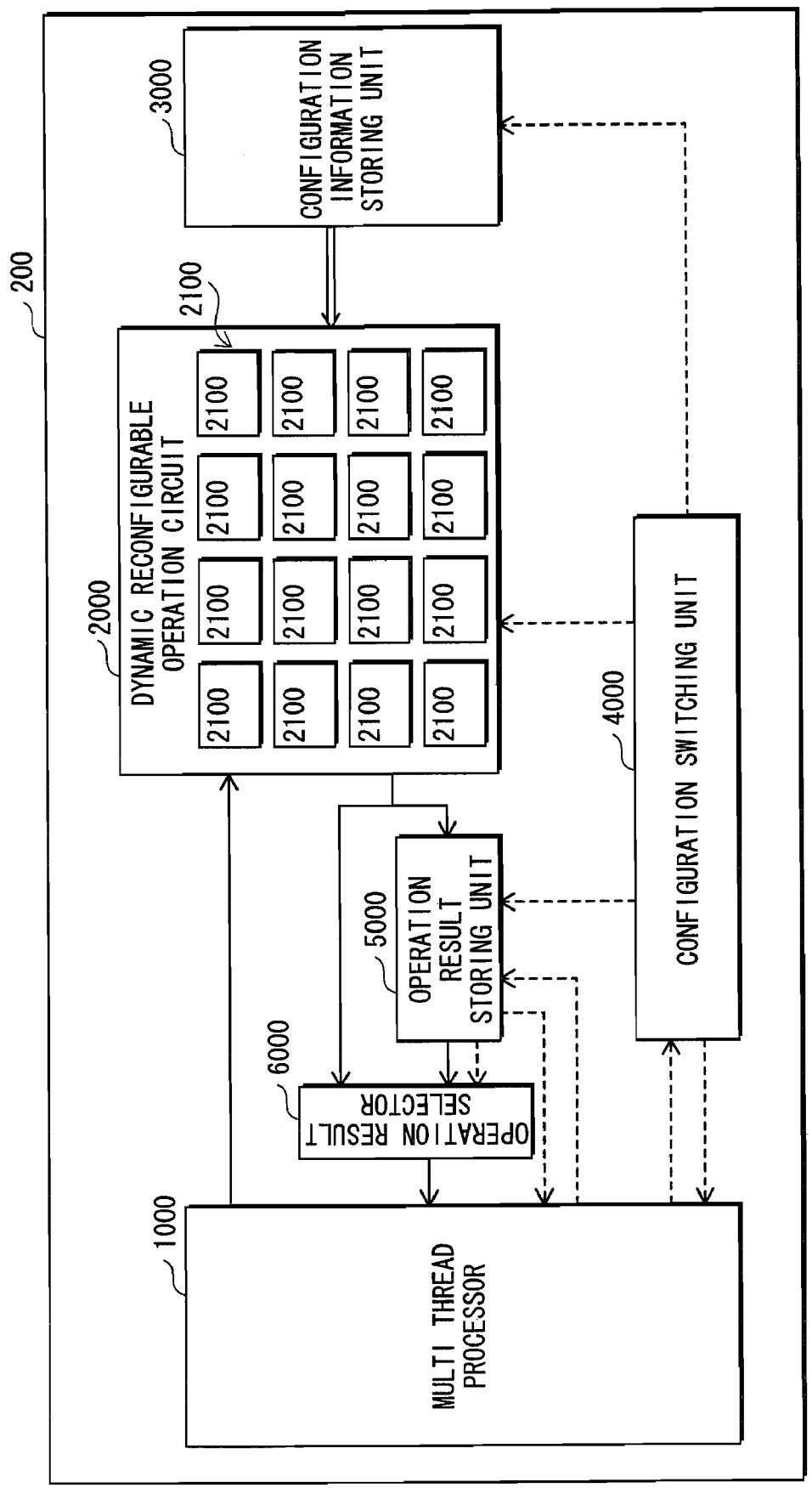
FIG. 30 is a functional block diagram showing a processor 200 in a third embodiment of the present invention.

FIG. 30 is a functional block diagram showing the configuration of a processor 200 in the third embodiment of the present invention. In FIG. 30, the same characters as those in FIG. 1 are used for the same components, and a description thereof is omitted.

The operation result selector 6000 selects the operation result data sent from the dynamic reconfigurable operation circuit 2000 and the operation result storing unit 5000, and transfers the selected operation result data to the multi thread processor 1000. This process is controlled by the operation result storing unit 5000.

In the first embodiment, the operation result data was transferred from only the operation result storing unit 5000 to the multi thread processor 1000. In the configuration of the first embodiment, the operation result data is always routed through the operation result storing unit 5000. Therefore, the transfer is delayed for the number of cycles for the writing and reading in/from the operation result storing unit 5000.

In other words, the operation performance deteriorates due to the delay when the operation result data of the dynamic reconfigurable operation circuit 2000 is to be used by the multi thread processor 1000 immediately after the operation.

The above-described problem is solved in the third embodiment.

In a case where the operation data is stored in the operation result storing unit 5000 (the values of the DMWA and DMRA are different), the operation result selector 6000 selects the data of the operation result storing unit 5000. Then, the processes described in the first embodiment are performed.

In a case where the operation data is not stored in the operation result storing unit 5000 (the values of the DMWA and DMRA are the same), the operation result storing unit 5000 sends the operation stop signal to the multi thread processor 1000.

Subsequently, the operation result storing unit 5000 performs the following control in a cycle where the dynamic reconfigurable operation circuit 2000 stores the operation result data in the operation result storing unit 5000.

The operation result storing unit 5000 causes the operation result selector 6000 to select the operation result data of the dynamic reconfigurable operation circuit 2000, and also removes the operation stop signal from the multi thread processor 1000.

The above-described process makes it possible for the operation result data of the dynamic reconfigurable operation circuit 2000 to be directly passed to the multi thread processor 1000, without being stored in the operation result storing unit 5000. The addresses of the DMWA and DMRA of the thread are not incremented.

The above-described configuration and control can reduce latency for the writing and reading of the operation result storing unit 5000, thereby improving the operation performance of the processor 100.

Fourth Embodiment

Figure 31:
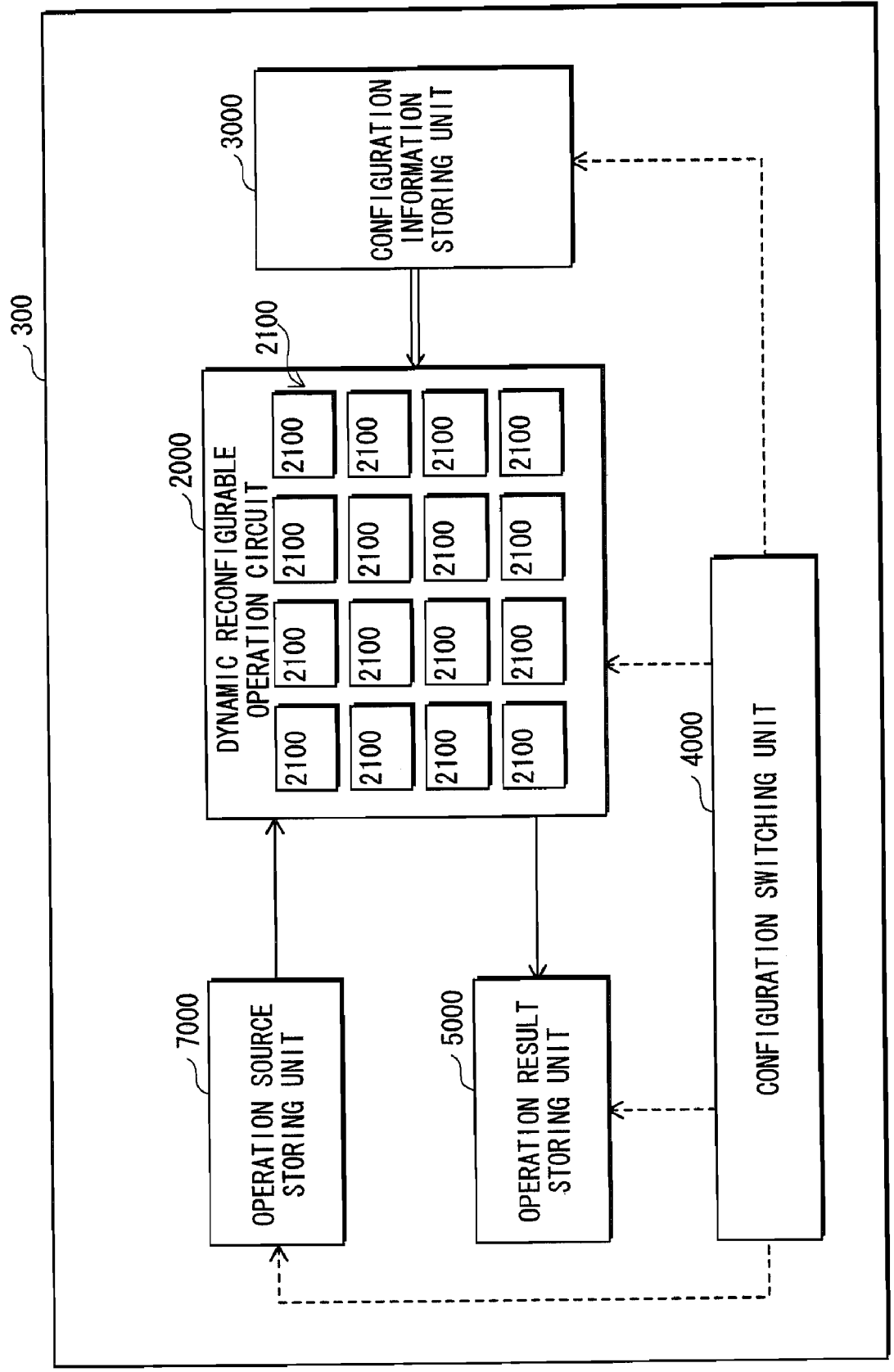
FIG. 31 is a functional block diagram showing a processor 300 in a fourth embodiment of the present invention.

FIG. 31 is a functional block diagram showing the processor 300 in the fourth embodiment of the present invention. In FIG. 31, the same characters as those in FIG. 1 are used for the same components, and a description thereof is omitted.

The difference from the first embodiment is that the fourth embodiment does not include the multi thread processor 1000 shown in FIG. 1, but includes an operation source storing unit 7000.

In other words, the present embodiment describes the execution of a thread whose processes are all performed by the dynamic reconfigurable operation circuit 2000.

<General Outline>

In the fourth embodiment, the supply of the operation data to the dynamic reconfigurable operation circuit 2000 is performed by the operation source storing unit 7000, instead of the multi thread processor 1000. Also, the operation instruction to the dynamic reconfigurable operation circuit 2000 is given by the configuration switching unit 4000, and the reading of the operation result data from the operation result storing unit 5000 is performed by a data transfer controller DMAC, which is not shown in figures.

The operation source storing unit 7000 stores the operation source data of the dynamic reconfigurable operation circuit 2000. The operation source data is supplied by the data transfer controller DMAC.

The operation source storing unit 7000 is controlled by the configuration switching unit 4000, and the addresses for the writing and reading are managed for each thread.

The management of the read and write addresses in the operation source storing unit 7000 is the same as the management in the operation result storing unit 5000 of the first embodiment. However, a read request is made by the configuration switching unit 4000. In addition, the write data is transferred from the data transfer controller DMAC to the operation source storing unit 7000, and read data is transferred from the operation source storing unit 7000 to the dynamic reconfigurable operation circuit 2000.

With the above-described configuration, even though the processor is not an element of the configuration, it is possible to prevent the degradation of performance when switching the configuration of the dynamic reconfigurable operation circuit 2000.

Furthermore, the dynamic reconfigurable operation circuit 2000 does not need to save the intermediate operation data that requires reading and writing all at once, and just sequentially stores the operation result data that needs to be read and written. Therefore, the storing unit can be realized by a memory having a small number of input/output ports, resulting in the area of the circuit being smaller.

Furthermore, the operation result data stored in the storing regions in the operation source storing unit 7000 and the operation result storing unit 5000 are managed in FIFO for each thread. Therefore, programs executed by the processor 300 are not affected by the order of the operations when switching the configurations, and can be managed for each thread. Therefore, the data transfer controller DMAC can easily read the operation result data for each thread.

Application Examples

Figure 32:
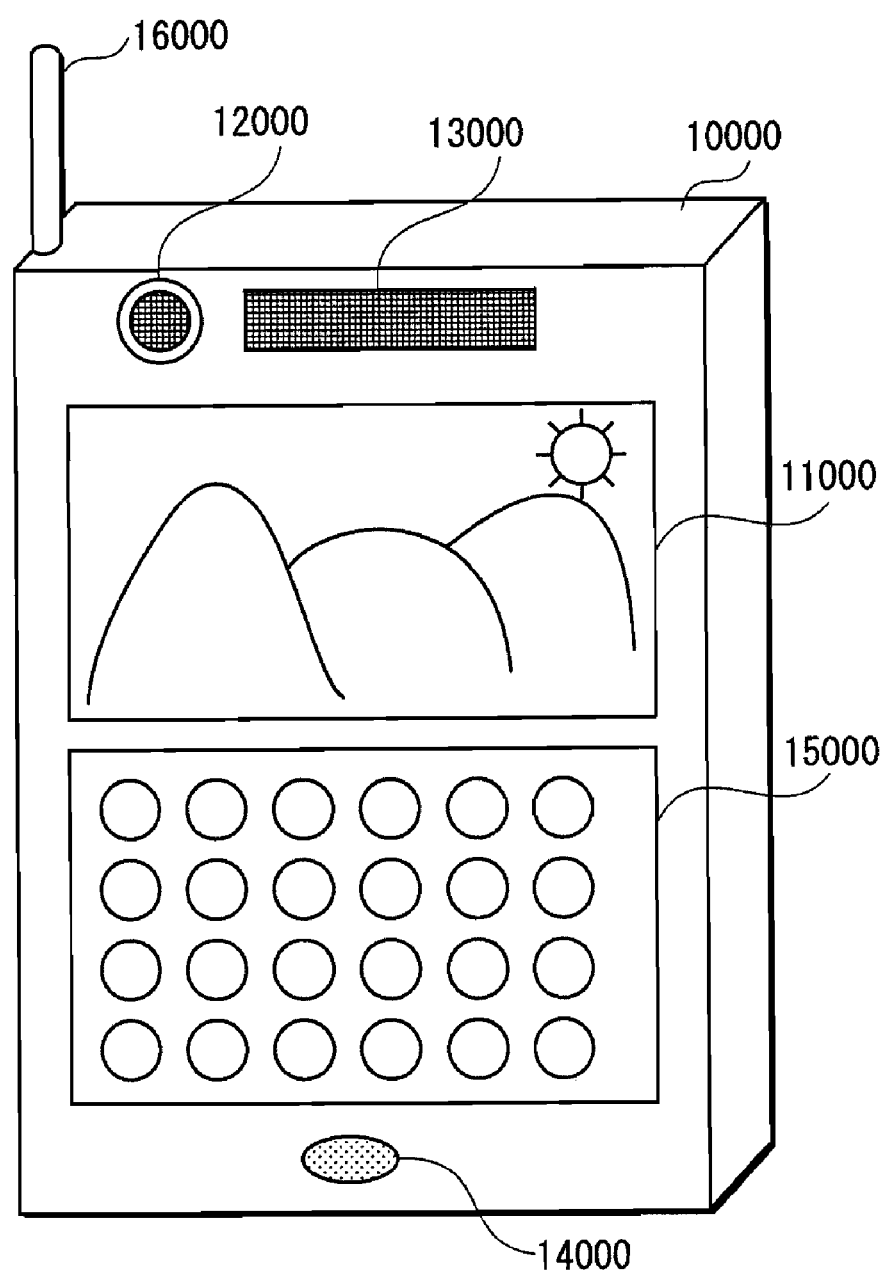
FIG. 32 shows a mobile communication device in which the processor of the present invention is mounted.

The processors of the present invention can be mounted in mobile communication devices and such. FIG. 32 shows a mobile communication device in which the processor of the present invention is mounted.

A mobile communication device 10000 includes a display 11000, an image-capturing unit 12000, an audio output unit 13000, an audio input unit 14000, a command input unit 15000, an antenna 16000, and the processor 100 (see FIG. 1) of the present invention inside the device 10000.

The processor 100 is connected to the display 11000 via a video frame buffer. The processor 100 performs processes of (i) decoding still images such as JPEG, (ii) decoding moving images such as MPEG, (iii) three-dimensional graphics such as games, and (iv) text drawing. Then, the processor 100 performs a process of superimposing the images. The display 11000 shows a resultant image obtained by the process of superimposing.

The processor 100 is connected to the image-capturing unit 12000 via the video frame buffer. The processor 100 performs processes of (i) encoding still images such a JPEG, and (ii) encoding moving images such as MPEG, on images input by the image-capturing unit 12000.

Furthermore, the processor 100 is connected to the audio output unit 13000 via an audio frame buffer. The processor 100 performs a process of decoding audio such as MPEG. The audio output unit 13000 outputs audio that is processed by the processor 100.

Also, the processor 100 is connected to the audio input unit 14000 via the audio frame buffer. The processor 100 performs a process of encoding audio such as MPEG, on audio input by the audio input unit 14000.

Video processes and audio processes such as JPEG and MPEG have various kinds of standards, and the content of each process is different. Such processes impose a heavy load on a processor. However, multi thread processor 1000 causes the dynamic reconfigurable operation circuit 2000 to perform each of the processes. Therefore, the processor 100 can flexibly support a plurality of processes having different standards.

The processor 100 is connected to the antenna 16000 and a radio frequency circuit block that is not shown in figures, and forms a wireless network by performing a communication process. The processor 100 also performs encrypting and decrypting processes for sent and received data.

There are various kinds of communication standards and encryption standards, and the content of a process is different for each standard. Also, the multi thread processor 1000 causes the dynamic reconfigurable operation circuit 2000 to perform a heavy load operation. Therefore, the processor 100 can flexibly support a plurality of processes having different standards.

The operations of the mobile communication device 10000 are input, from the command input unit 15000, with use of a finger or a pointer.

Most communication systems, image processing systems, and security processing systems support a plurality of standards, and thus receive an advantageous effect of the present invention. The present invention is advantageous to not only the above-described mobile communication device, but also image display devices such as TVs, DVD players, and car navigation systems, image recording devices such as DVD recorders, video cameras, digital still cameras (DSC), and security cameras, devices such as audio players, and communication systems and security processing systems in communication devices.

<Supplemental Remarks>

A processor according to the present invention has been described based on various embodiments. However, the processor of the present invention is of course not limited to the specific embodiments shown in the above-described embodiments, and can be partially modified as follows.

(1) In the above-described embodiment, the operation cells of the dynamic reconfigurable operation circuit 2000 are arranged in 4×4 array. However, the arrangement is not limited to such. For example, the operation cells may be arranged in a 10×4 rectangular array, or in a line-by-line basis.

Also, the operation cells 2100 performs multiplication, shifting, addition, and a logic operation. However, the operation cells 2100 may further perform division, subtraction, and a rotation operation. The number of types of operation may be increased or decreased.

Furthermore, all the operation cells 2100 have the same configuration. However, the configuration of each operation cell 2100 does not always need to be the same. For example, only the specific operation cells 2100 may perform division.

Note that more than one operation cell 2100 may switch the configurations at the same time.

Also, all the operation cells 2100 and the dynamic reconfiguration connector 2200 can switch the configurations. However, some operation cells 2100 and dynamic reconfiguration connector 2200 may not switch the configurations.

Furthermore, each of the operation cells 2100 has one input and one output. However, the number of inputs and outputs thereof may be changed such as three inputs and two outputs. In that case, the numbers of inputs and pieces of operation data of the operation source selector 2210 may be increased, and the number of inputs of the output data selector 2250 may also be increased, so as to correspond to the number of inputs and outputs of each operation cell 2100.

Also, each of the operation cells 2100 is connected to the configuration switching unit 4000 via a different signal line for switching the configuration. However, it is possible to use the same switch signal line between the operation cells 2100 whose configurations are always switched at the same time.

Furthermore, the operation cells 2100 perform operations in the same clock cycle. However, the operation clock may be changed for each operation cell by providing the operation cells with a plurality of clock lines.

Also, the configuration of the dynamic reconfigurable operation circuit 2000 is changed in synchronization with the thread that is being executed in the multi thread processor 1000. However, only the configuration of the dynamic reconfigurable operation circuit 2000 may be appropriately changed, without changing the thread that is being processed by the processor.

(2) In the first and second embodiments, the operations of the threads A, B, and C that run in the multi thread processor 1000 are performed in the dynamic reconfigurable operation circuit 2000. However, it is possible to include a thread that is executable without the dynamic reconfigurable operation circuit 2000. In that case, the configuration of the thread may be switched to a configuration of a thread that is executed by the dynamic reconfigurable operation circuit 2000.

Also, the multi thread processor 1000 and the dynamic reconfigurable operation circuit 2000 operate in the same clock cycle. However, it is possible to change the operation clock by arranging a plurality of clock lines.

Furthermore, the multi thread processor 1000 may not support a plurality of threads, or may have a multi-core configuration in which a plurality of cores are integrated. Also, the inner configuration of the multi thread processor 1000 may be the reconfigurable operation circuit.

(3) In the first and second embodiments, only the operation result data of the dynamic reconfigurable operation circuit 2000 obtained by performing an operation for a thread that is being executed in the multi thread processor 1000 is read with the read instruction given from the multi thread processor 1000 to the operation result storing unit 5000. However, operation result data of other threads may also be read with the read instruction.

In that case, an operand that specifies a thread number is added to the read instruction, and given to the operation result storing unit 5000 from the multi thread processor 1000 at the time of reading. Then, the operation result storing unit 5000 switches the DMRA to a DMRA having the thread number that has been given. This makes it possible to read the operation results of other threads.

Furthermore, the multi thread processor 1000 does not need to support the read instruction. Instead, an operand of the operation instruction to the dynamic reconfigurable operation circuit 2000 may specify the register in the multi thread processor 1000 as the destination. Then, after the operations in the dynamic reconfigurable operation circuit 2000 are completed, the operation result data may be written in the register.

Also, there are two pieces of source data for the operation instruction, and a piece of data for the read instruction. However, the numbers of data pieces may be changed. When the number of pieces of the operation source data for the dynamic reconfigurable operation circuit 2000 is increased, (i) the number of data wirings from the multi thread processor 1000 to the dynamic reconfigurable operation circuit 2000, (ii) the number of output ports of the multi thread processor 1000, and (iii) the number of input ports of the dynamic reconfigurable operation circuit 2000 may be increased, so as to correspond to the increased number of pieces of the operation source data.

In a case of an increase in the number of pieces of read data from the operation result storing unit 5000, (i) the number of wirings from the operation result storing unit 5000 to the multi thread processor 1000, (ii) the number of input ports of the multi thread processor 1000, (iii) the number of output ports of the operation result storing unit 5000 may be increased.

Furthermore, the instruction for setting an address of a region for each thread, which is given to the operation result storing unit 5000, is also for setting an end address of each region. However, an operand for setting the end address is not necessary. When start addresses are set for the regions of all the threads, the region of each thread may be judged to be a region from the start address to a start address of a region for another thread.

Also, the process of the multi thread processor 1000 is switched in one cycle. However, the process may be switched in a plurality of cycles. In this case, the configuration switching unit 4000 may cause the dynamic reconfigurable operation circuit 2000 and the operation result storing unit 5000 to stop their respective processes for the number of cycles required for the process of switching the multi thread processor 1000.

(4) In the first, second, and third embodiments, the regions of the threads are managed in FIFO by the operation result storing unit 5000. However, the regions may be managed in another method such as LIFO (Last In First Out).

Also, the DMWA and DMRA are managed by the operation result storing unit 5000. However, the DMWA and DMRA may be managed by the multi thread processor 1000 or the configuration switching unit 4000.

(5) In the fourth embodiment, the operation result data of each thread is managed in FIFO by the operation source storing unit 7000. However, the data may be managed in another method such as LIFO.

Also, the write address and read address may be managed by the configuration switching unit 4000, instead of the operation source storing unit 7000.

(6) In the first, second, and third embodiments, the configuration information of each thread is stored in the configuration information storing unit 3000. However, the configuration information storing unit 3000 is not necessary. Instead, storing units that preliminarily store the configuration information of all the threads may be provided for the operation cells, the operation source selectors, and the output data selector. Then, at the time of switching threads, the storing units may receive the thread number and the switch instruction from the configuration switching unit 4000, so that the configurations of the operation cells, the operation source selectors, and the output data selector are reconfigured into configurations as desired.

With the structure described above, although no wirings of the configuration information storing unit 3000 are necessary, registers need to be used as the storing units for preliminarily storing the configuration information for all the threads. This means that even though the configuration information storing unit 3000 can be formed with a memory having a small number of input/output ports, the area for the storing units is added to the processor.

(7) In the above-described embodiments, the timing of the reconfiguration of the operation cells are controlled by the instruction given by the configuration switching unit 4000 (see FIG. 16: step S400-step S420). However, the timing of the reconfiguration may be judged by each of the operation cells.

For example, all the operation cells 2100 judge the timing in parallel as follows.

Upon receiving an instruction for the reconfiguration from the configuration switching unit 4000 after the wait cycle period elapses, each of the operation cells 2100 determines the number of standby cycles E, and holds the control of switching configurations for the number of standby cycles E. The number of standby cycles E represents the number of operation cells 2100 (the number of operation rows) that exist before an operation cell that is targeted for the reconfiguration in the next thread. The value of E for each operation cell can be obtained by referring to the operation cell row number table 4100 (see FIG. 9(a)).

For example, in each thread, the number of operation rows before the operation cell a is zero. Therefore, the process of switching configuration is performed immediately upon receipt of the instruction for the reconfiguration. Meanwhile, the operation cell m needs to wait for three cycles in the thread A, seven cycles in the thread B, and fifteen cycles in the thread C.

When finishing the calculation of the number of standby cycles E, the configuration switching unit 4000 instructs the configuration information storing unit 3000 to read (i) the configuration information of the operation cell 2100 in the next thread, and (ii) the configuration information of the corresponding operation source selector 2210 in the next thread. The read pieces of the configuration information are supplied to the operation cell 2100 and the operation source selector 2210 respectively, via a bus for transferring the configuration information.

Subsequently, the configuration switching unit 4000 generates the configuration switch signal and send the signal to the operation cell 2100 and the operation source selector 2210. Upon receipt of the configuration switch signal, the operation cell 2100 and the operation source selector 2210 read the configuration information supplied via the bus for transferring the configuration information, and switch the configurations for the next thread.

The configuration switching unit 4000 calculates the number of cycles necessary for all the operation cells to be reconfigured for the next thread, by referring to the thread row number table 4200 (FIG. 9B), and starts the reconfiguration of the output data selector 2250.

(8) In the above-described embodiments, the operation cells of the current thread and the next thread are executed concurrently when switching the threads. However, the execution of the next thread may begin in the next cycle as soon as the process of the current thread ends. This is because the operation cells are sequentially reconfigured for the next thread, beginning from an operation cell that has completed the execution of the current thread, during the execution of the current thread, thereby eliminating the time for reconfiguration.

(9) A program that causes a CPU to execute control processes (see FIG. 14) for realizing the functions of the processor in the above-described embodiments may be recorded onto a recording medium or distributed via a communication channel and the like. Examples of such a recording medium include an IC card, optical disc, flexible disk, ROM, and flash memory. The distributed program is made available for use by being stored in a memory that is readable by a CPU in an apparatus. The functions of the processor described in the above-described embodiment are realized by the CPU executing the program.

INDUSTRIAL APPLICABILITY

The processor 100 of the present invention that performs multi-threaded processing prevents degradation in performance when switching configurations in the dynamic reconfigurable operation circuit 2000.

Also, the processor 100 does not need to save intermediate operation data that needs to be read and write all at once, and stores only the operation result data that needs to be sequentially read and written. Therefore, the storing unit is realized by a memory having a small number of input/output ports, which makes it possible to prevent the area of the circuit from becoming large.

Furthermore, the operation result data stored in the storing unit is managed in FIFO for each thread. Therefore, a program executed in the multi thread processor 1000 manages each thread without consideration to the order of the operations when switching configurations. This makes it possible to easily create a program for reading.

With the stated configuration, the present invention is useful as a media processing device in which time-division multiplexing is necessary. Also, the present invention is applicable to uses such as communication and security.

The invention claimed is:

1. A processor that cyclically executes a plurality of threads,
    wherein an operation is repeatedly executed in each of the plurality of threads, the operation being performed by a predetermined number of operation cells of a plurality of operation cells one by one in a sequential order, the predetermined number being different for each thread of the plurality of threads, and
    wherein the processor comprises:
        an operation circuit including the plurality of operation cells each having reconfigurable configurations and connections therebetween;
        a reconfiguration unit operable to reconfigure one operation cell of the plurality of operation cells, based on a corresponding piece of configuration information of a plurality of pieces of configuration information;
        a configuration information storing unit storing a plurality of configuration information sets, such that each respective configuration information set of the plurality of configuration information sets corresponds, in a one-to-one relationship, with a respective thread of the plurality of threads, and such that each respective configuration information set of the plurality of configuration information sets includes the plurality of pieces of configuration information, each respective piece of configuration information of the plurality of pieces of configuration information corresponding, in a one-to-one relationship, with a respective operation cell of the plurality of operation cells; and a control unit operable to (i) cause the reconfiguration unit to sequentially reconfigure each respective operation cell, of the plurality of operation cells, that has a configuration for a current thread, of the plurality of threads, when the respective operation cell has completed a last operation in the current thread, based on a piece of configuration information, of the plurality of pieces of configuration information, corresponding to the respective operation cell that has completed the last operation, the piece of configuration information corresponding to the respective operation cell that has completed the last operation being from a configuration information set, of the plurality of configuration information sets, that corresponds to a next thread of the plurality of threads, and (ii) cause a concurrent execution of (a) an operation cell, of the plurality of operation cells, that has a configuration for the current thread and (b) an operation cell, of the plurality of operation cells, that has a configuration for the next thread.

2. The processor of claim 1, further comprising an operation result storing unit that stores an operation result of each thread of the plurality of threads in a region of a plurality of regions, the operation result being a result of operations performed by the plurality of operation cells, wherein the control unit (i) causes the operation result storing unit to store, in a region of the plurality of regions that corresponds to the current thread and that is located in the operation result storing unit, an operation result of a last operation cell from among operation cells, of the plurality of operation cells, having a configuration for the current thread, (ii) reads an operation result stored in a region, of the plurality of regions, corresponding to the next thread, and (iii) supplies the read operation result to an operation cell, of the plurality of operation cells, that is to be executed first in the next thread to perform an operation for the next thread using the read operation result.

3. The processor of claim 1, further comprising an operation result storing unit that stores an operation result of an operation cell, of the plurality of operation cells, that has completed a last operation in a thread of the plurality of threads and that is a last operation cell from among operation cells having a configuration for the thread, wherein the control unit (i) causes an execution of an operation cell, of the plurality of operation cells, that is to be executed first in a next repetition in the current thread, based on an operation result of an operation cell, of the plurality of operation cells, that is executed last in a current repetition in the current thread, and (ii), when switching threads, reads an operation result stored in the operation result storing unit in a previous repetition of the next thread, supplies the read operation result to an operation cell, of the plurality of operation cells, that is to be executed first in the next thread, and causes the operation cell that is to be executed first to perform an operation for the next thread using the read operation result.

4. An execution method for a processor that includes an operation circuit including a plurality of operation cells each having reconfigurable configurations and connections therebetween, and that cyclically executes a plurality of threads, wherein an operation is repeatedly executed in each of the plurality of threads, the operation being performed by a predetermined number of operation cells of the plurality of operation cells one by one in a sequential order, the predetermined number being different for each thread of the plurality of threads, wherein the execution method comprises:
a reconfiguring step including reconfiguring one operation cell of the plurality of operation cells, based on a corresponding piece of configuration information of a plurality of pieces of configuration information; and
a storing step including storing, in a memory, a plurality of configuration information sets, such that each respective configuration information set of the plurality of configuration information sets corresponds, in a one-to-one relationship, with a respective thread of the plurality of threads, and such that each respective configuration information set of the plurality of configuration information sets includes the plurality of pieces of configuration information, each respective piece of configuration information of the plurality of pieces of configuration information corresponding, in a one-to-one relationship, with a respective operation cell of the plurality of operation cells, wherein the reconfiguring step includes sequentially reconfiguring each respective operation cell, of the plurality of operation cells, that has a configuration for a current thread, of the plurality of threads, when the respective operation cell has completed a last operation in the current thread, based on a piece of configuration information, of the plurality of pieces of configuration information, corresponding to the respective operation cell that has completed the last operation, the piece of configuration information corresponding to the respective operation cell that has completed the last operation being from a configuration information set, of the plurality of configuration information sets, that corresponds to a next thread of the plurality of threads and is stored in the memory in the storing step, and wherein the reconfiguring step includes causing a concurrent execution of (a) an operation cell, of the plurality of operation cells, that has a configuration for the current thread and (b) an operation cell, of the plurality of operation cells, that has a configuration for the next thread.

5. A non-transitory computer-readable recording medium having a computer program recorded thereon, the computer program causing a processor to perform execution processing, the processor comprising an operation circuit including a plurality of operation cells each having reconfigurable configurations and connections therebetween, and the processor cyclically executing a plurality of threads, wherein an operation is repeatedly executed in each of the plurality of threads, the operation being performed by a predetermined number of operation cells of the plurality of operation cells one by one in a sequential order, the predetermined number being different for each thread of the plurality of threads, and wherein the computer program causes the processor to execute a method comprising:
a reconfiguring step including reconfiguring one operation cell of the plurality of operation cells, based on a corresponding piece of configuration information of a plurality of pieces of configuration information; and
a storing step including storing, in a memory, a plurality of configuration information sets, such that each respective configuration information set of the plurality of configuration information sets corresponds, in a one-to-one relationship, with a respective thread of the plurality of threads, and such that each respective configuration information set of the plurality of configuration information sets includes the plurality of pieces of configuration information, each respective piece of configuration information of the plurality of pieces of configuration information corresponding, in a one-to-one relationship, with a respective operation cell of the plurality of operation cells, wherein the reconfiguring step includes sequentially reconfiguring each respective operation cell, of the plurality of operation cells, that has a configuration for a current thread, of the plurality of threads, when the respective operation cell has completed a last operation in the current thread, based on a piece of configuration information, of the plurality of pieces of configuration information, corresponding to the respective operation cell that has completed the last operation, the piece of configuration information corresponding to the respective operation cell that has completed the last operation being from a configuration information set, of the plurality of configuration information sets, that corresponds to a next thread of the plurality of threads and is stored in the memory in the storing step, and wherein the reconfiguring step includes causing a concurrent execution of (a) an operation cell, of the plurality of operation cells, that has a configuration for the current thread and (b) an operation cell, of the plurality of operation cells, that has a configuration for the next thread.

6. A processor that cyclically executes a plurality of threads, wherein an operation is repeatedly executed in each of the plurality of threads, the operation being performed by a predetermined number of operation cells of a plurality of operation cells one by one in a sequential order, the predetermined number being different for each thread of the plurality of threads, and wherein the processor comprises:

an operation circuit including a plurality of operation cells each having reconfigurable configurations and connections therebetween;

a reconfiguration unit operable to reconfigure one operation cell of the plurality of operation cells, based on a corresponding piece of configuration information of a plurality of pieces of configuration information;

a configuration information storing unit storing a plurality of configuration information sets, such that each respective configuration information set of the plurality of configuration information sets corresponds, in a one-to-one relationship, with a respective thread of the plurality of threads, and such that each respective configuration information set of the plurality of configuration information sets includes the plurality of pieces of configuration information, each respective piece of configuration information of the plurality of pieces of configuration information corresponding, in a one-to-one relationship, with a respective operation cell of the plurality of operation cells; and a control unit operable to (i) cause the reconfiguration unit to sequentially reconfigure each respective operation cell, of the plurality of operation cells, that has a configuration for a current thread, of the plurality of threads, when the respective operation cell has completed a last operation in the current thread, based on a piece of configuration information, of the plurality of pieces of configuration information, corresponding to the respective operation cell that has completed the last operation, the piece of configuration information corresponding to the respective operation cell that has completed the last operation being from a configuration information set, of the plurality of configuration information sets, that corresponds to a next thread of the plurality of threads, and (ii) cause an execution of an operation cell, of the plurality of operation cells, that has a configuration for the next thread, after an execution of an operation cell, of the plurality of operation cells, that has a configuration for the current thread.

* * * * *